United States Patent
George et al.

(10) Patent No.: US 12,154,249 B2
(45) Date of Patent: Nov. 26, 2024

(54) MULTIMODAL INSPECTION SYSTEM

(71) Applicant: Battelle Memorial Institute, Columbus, OH (US)

(72) Inventors: Anthony George, Columbus, OH (US); Thomas Kent, Columbus, OH (US); Blaine Miller, Columbus, OH (US); Katie Liszewski, Columbus, OH (US); Russell Gilabert, Columbus, OH (US); Timothy McDonley, Columbus, OH (US)

(73) Assignee: BATTELLE MEMORIAL INSTITUTE, Columbus, OH (US)

( * ) Notice: Subject to any disclaimer, the term of this patent is extended or adjusted under 35 U.S.C. 154(b) by 0 days.

(21) Appl. No.: 18/240,021

(22) Filed: Aug. 30, 2023

(65) Prior Publication Data

US 2024/0062330 A1 Feb. 22, 2024

Related U.S. Application Data

(63) Continuation of application No. 17/216,304, filed on Mar. 29, 2021, now Pat. No. 11,756,157.

(Continued)

(51) Int. Cl.
| | |
|---|---|
| *G06T 11/60* | (2006.01) |
| *G01S 13/86* | (2006.01) |
| *G01S 13/89* | (2006.01) |
| *G01S 17/86* | (2020.01) |
| *G01S 17/89* | (2020.01) |

(Continued)

(52) U.S. Cl.
CPC .......... *G06T 3/4038* (2013.01); *G01S 13/865* (2013.01); *G01S 13/89* (2013.01); *G01S 17/86* (2020.01); *G01S 17/89* (2013.01); *G06T 3/14* (2024.01)

(58) Field of Classification Search
CPC ............... G06Q 10/087; G06K 9/6262; G06T 3/4038; G06T 3/0068; G01S 17/86; G01S 13/89; G01N 22/02; G01N 21/3581; G01N 21/8915; G01B 11/06; G01B 7/06
See application file for complete search history.

(56) References Cited

U.S. PATENT DOCUMENTS

| | | | |
|---|---|---|---|
| 11,756,157 B2 * | 9/2023 | George | G01N 21/95684 382/100 |
| 2010/0245566 A1 | 9/2010 | Lev et al. | |

(Continued)

FOREIGN PATENT DOCUMENTS

| | | |
|---|---|---|
| JP | 2004340632 A | 12/2004 |
| JP | 2006010429 A | 1/2006 |
| JP | 2009042089 A | 2/2009 |

OTHER PUBLICATIONS

International Search Report an Written Opinion received Feb. 2, 2022 in related PCT/US2021/024689.

*Primary Examiner* — Phuoc H Doan
(74) *Attorney, Agent, or Firm* — Volpe Koenig

(57) ABSTRACT

A multimodal inspection system (MIS) is disclosed herein. The MIS may use one or more modalities to inspect a sample. Some of the modalities include, but are not limited to, Raman, visible (VIS), terahertz (THz) spectroscopy, longwave infrared (LWIR), shortwave infrared (SWIR), laser profilometry (LP), electromagnetic interference (EMI) near field probing, and/or, Millimeter Wave (MMW) radar.

20 Claims, 29 Drawing Sheets

Related U.S. Application Data

(60) Provisional application No. 63/001,009, filed on Mar. 27, 2020.

(51) Int. Cl.
    *G06T 3/14*    (2024.01)
    *G06T 3/4038*    (2024.01)

(56) References Cited

U.S. PATENT DOCUMENTS

| | | |
|---|---|---|
| 2018/0180557 A1 | 6/2018 | Deferm et al. |
| 2019/0215486 A1* | 7/2019 | Venshtain ............... H04N 23/60 |
| 2021/0082101 A1 | 3/2021 | Kent et al. |

* cited by examiner

FIG. 18

MULTIMODAL INSPECTION SYSTEM

CROSS REFERENCE TO RELATED APPLICATIONS

This application is a continuation U.S. patent application Ser. No. 17/216,304, filed Mar. 29, 2021, which claims the benefit of U.S. Provisional Patent Application No. 63/001,009 filed Mar. 27, 2020 entitled MULTIMODAL INSPECTION SYSTEM, which application is incorporated by reference as if fully set forth.

This application further incorporates by reference U.S. patent application Ser. No. 17/022,834 filed Sep. 16, 2020 entitled SYSTEM AND METHOD FOR RAPID INSPECTION OF PRINTED CIRCUIT BOARD USING MULTIPLE MODALITIES, which application is incorporated by reference as if fully set forth.

BACKGROUND

Electronic Commercial Off-The-Shelf (COTS) items are packaged electronic components that are used in custom systems. Usually, an electronic COTS item comprises a printed circuit board (PCB) with various integrated circuits (ICs) and discrete components mounted on the PCB and electrically interconnected by printed circuitry of the PCB. For example, a military air force or civilian airline may use a COTS item as an aircraft component. In many cases, the customer (e.g., air force or airline) will qualify a COTS item for use in a particular system (e.g., a particular model/make aircraft) based on component specifications and/or extensive testing to ensure the COTS item meets stringent performance and reliability criteria. For example, an air force may require all ICs in a COTS item to be "military grade", for example having an operational temperature range meeting some required standard.

The outsourcing implicit in using a COTS item means that the customer does not control the manufacturing/supply chain producing the COTS item. For example, the manufacturer may make an undocumented revision to the COTS item that may potentially affect the customer. Another concern with employing COTS items in a system is that there is the potential to receive a counterfeit COTS item, which may have substitute (possibly lower quality) parts, or may introduce privacy-compromising capabilities or other issues. Another concern with employing COTS items is that the COTS item may not meet performance specifications provided by the supplier. This can occur due to use of lower performing counterfeit parts, use of manufacturing parameters that do not meet performance specifications, or so forth. For example, the peak operating temperature of a microprocessor depends upon many factors, such as the adequacy of its heat sinking, details of ancillary component (e.g., resistors) electrically connected with the microprocessor, and the particular firmware or software that the microprocessor executes. Some of these factors can be dependent upon manufacturing process particularities. For example, if heat sinking is provided in part by a metal layer disposed underneath the microprocessor and deposited on the PCB by a vacuum evaporation process, then errors in execution of the vacuum evaporation process can lead to inadequate heat sinking and hence to the COTS item failing to meet the microprocessor peak temperature specification. These types of performance deficiencies can result from inadvertent supplier errors, or can result from less innocent cost cutting measures taken by the supplier.

These types of concerns can be alleviated by testing of COTS items. In destructive analysis approaches, the COTS item is disassembled or otherwise destructively analyzed to assure it meets the requisite specifications. Naturally, destructive analysis can only be performed on "extra" COTS items delivered to the customer, which increases cost at the customer end. Furthermore, destructive analysis cannot provide assurance that the particular COTS item that is actually installed in a customer system meets specifications. Non-destructive analysis (NDA) overcomes these deficiencies. However, some manufacturing processes include minimal NDA, and existing NDA techniques can have disadvantages such as long test times and inability to detect certain types of flaws.

SUMMARY

A multimodal inspection system (MIS) is disclosed herein. The MIS may use one or more modalities to inspect a sample. Some of the modalities include, but are not limited to, Raman, visible (VIS), terahertz (THz) spectroscopy, longwave infrared (LWIR), shortwave infrared (SWIR), laser profilometry (LP), electromagnetic interference (EMI) near field probing, and/or, Millimeter Wave (MMW) radar.

A system and method for providing a multimodal inspection system are disclosed. The method includes capturing data from a plurality of sensors over a period of time to generate a set of captured data for each sensor of the plurality of sensors, capturing location information for each sensor of the plurality of sensors, performing spatial correlation on each set of captured data using in part the location information, analyzing the spatially correlated data for an anomaly, and generating a report regarding the anomaly based on the analyzed data.

The system includes a plurality of sensors configured to capture data over a period of time to generate a set of captured data for each sensor of the plurality of sensors, a stage positioned with location information that is captured information for each sensor of the plurality of sensors, a processor for performing spatial correlation on each set of captured data using in part the location information and analyzing the spatially correlated data for an anomaly, and an output device for generating and outputting a report regarding the anomaly based on the analyzed data.

The spatial correlation may include performing raster stitching for each set of captured data to generate a stitched image for each set of captured data. The raster stitching may further include performing a panoramic image registry function. The raster stitching may further include removing outliers from the stitched image by fitting the stitched image to a two-dimensional grid with known interval offsets and global rotation determined statistically from an output of the panoramic image registry function. One of the plurality of sensors may be a millimeter wave (MMW) radar and the method may include performing principal component analysis (PCA) on the captured data from the MMW radar, wherein the captured data for from the MMW radar includes data from a 20×20 antenna array. One of the plurality of sensors may be Long Wave Infrared (LWIR) with a radiation source that may be operated during data capture for the LWIR sensor.

The system includes a plurality of sensors configured to capture data over a period of time to generate a set of captured data for each sensor of the plurality of sensors, a stage positioned with location information that is captured information for each sensor of the plurality of sensors, a processor for performing spatial correlation on each set of captured data using in part the location information and analyzing the spatially correlated data for an anomaly, and an output device for generating and outputting a report regarding the anomaly based on the analyzed data.

The system may include a 20×20 antenna array for capturing data FROM the MMW radar where the processor is further configured to perform principal component analysis (PCA) on the captured data from the MMW radar.

BRIEF DESCRIPTION OF THE DRAWINGS

Furthermore, like reference numerals in the figures indicate like elements, and wherein:

FIG. 18 illustrates another example approach that may be used to determine the best configuration for an MMW radar data capture and analysis;

DETAILED DESCRIPTION

Described herein are systems, methods, and devices to implement multimodal inspection and analysis in a non-destructive manner of one or more samples. The techniques described may be applicable to a number of use cases, such as electronic device non-destructive analysis (NDA), electronic device quality assurance, electronic device counterfeiting detection, and the like. In one or more examples discussed herein, a sample may be a commercial off the shelf (COTS) printed circuit board (PCB), however, this is meant for illustrative purposes only and the techniques described herein may be applied to any sample item, commercial or otherwise.

Figure 1:
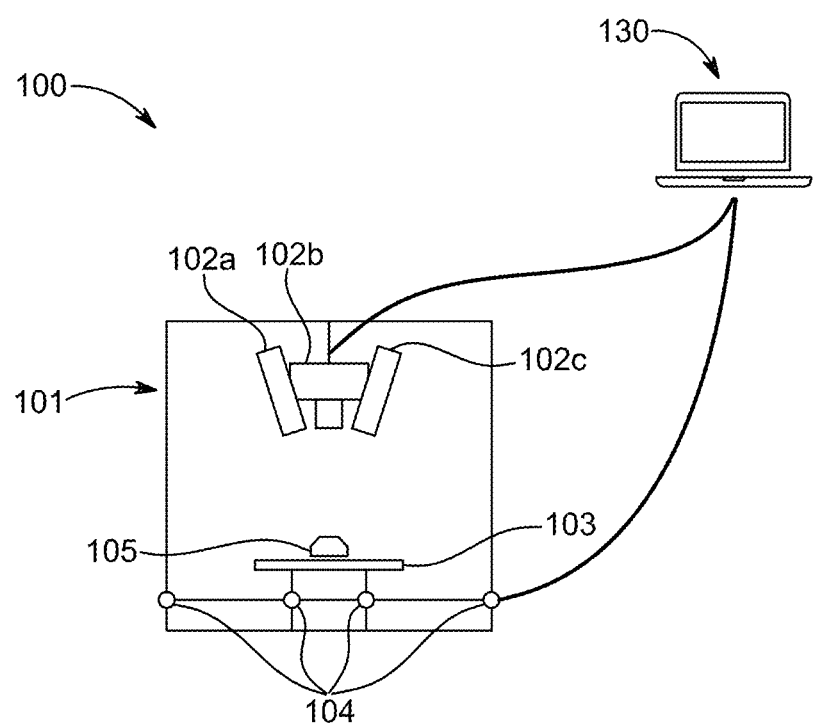
FIG. 1 illustrates an example multimodal inspection system (MIS) from a front-side-view perspective.

FIG. 1 illustrates an example multimodal inspection system (MIS) 100 from a front-side-view perspective. MIS 100 may be implemented with a mechanical scanning gantry 101 that provides the structure and frame for other components, such as one or more inspection elements 102 (e.g., 102a, 102b, 102c) for multiple modalities fixed above a translation stage/table 103. Inspection elements 102 may be pointed towards stage 103. At least one inspection element may be a sensor 102b (e.g., camera) that is aimed normal to the stage 103, and inspection elements 102a and 102c may be aimed at an angle. Stepper motors 104 may be attached to mechanical scanning gantry 101, and stage 103 may be attached to mechanical scanning gantry 101 via stepper motors 104. Stepper motors 104 may enable x, y, and/or z translation of stage 103 allowing control of the position of sample 105 with a high degree of accuracy (e.g., 12.5 μm of better). Stepper motors 104 may have both coarse and fine motor control.

Sample 105 may be removably attached to stage 103 allowing sample 105 to remain stationary as stage 103 is moved. This configuration may enable inspection elements 102 to remain stationary as stage 103, and fixed sample 105 (e.g., PCB), moves freely in one or more axes. In one example, stage 103 may be configured to laterally translate sample 105 relative to the plane of sample 105, such as the plane of a PCB. Sensors 102 and stepper motors 104 may be operatively connected to a computing device 130. Computing device 130 may be hard wired or connected wirelessly, and may be local or remote to scanning gantry 101 and attached components.

While not shown in FIG. 1, there may be one or more power supplies that may provide power to inspection elements 102, stepper motors 104, computing device 130, and/or sample 105 (e.g., for testing purposes such as for testing with sample 105 powered).

Figure 2:
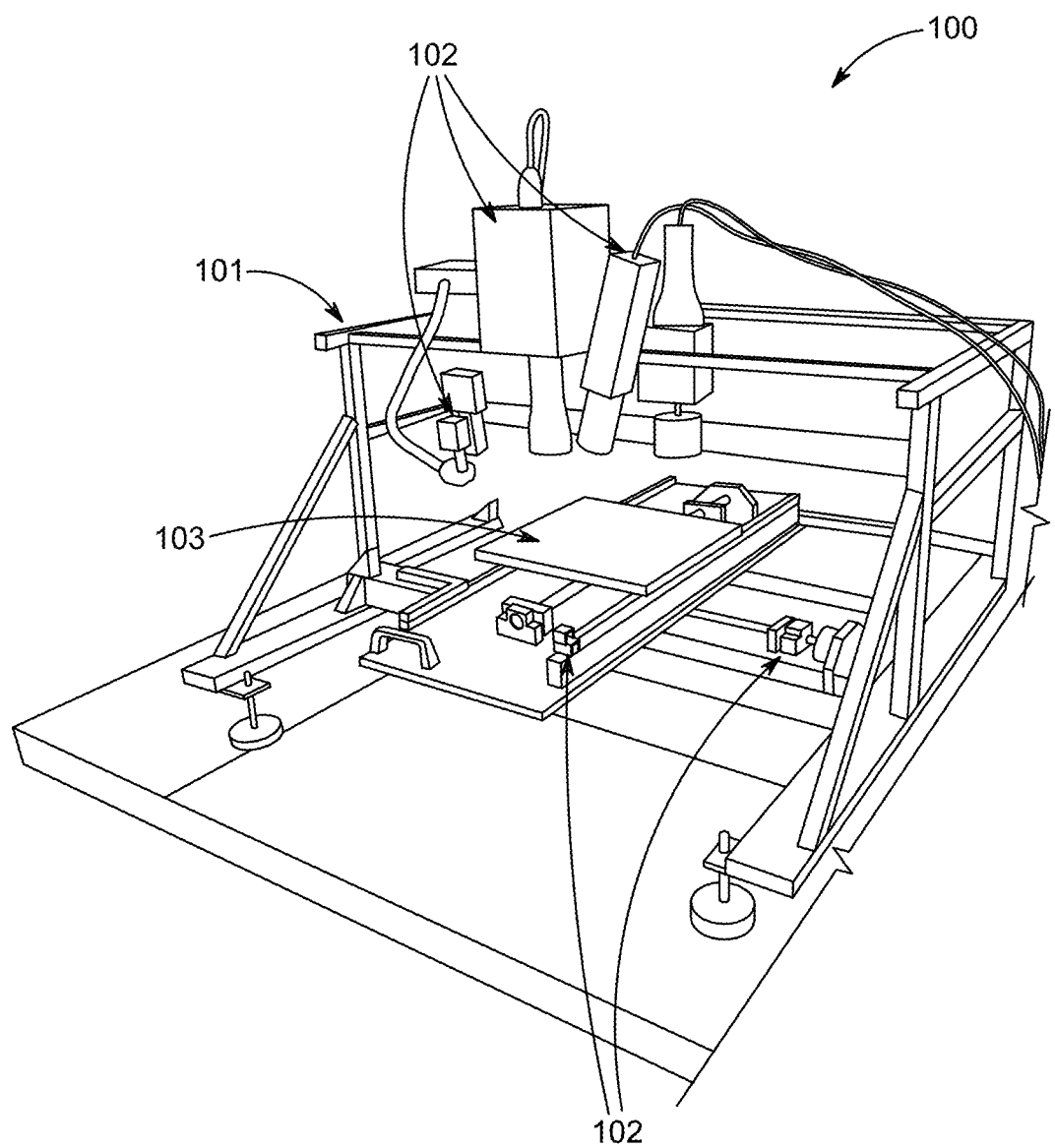
FIG. 2 illustrates an image of an example MIS.

FIG. 2 illustrates an image of an example MIS 100. Mechanical scanning gantry 101 provides the structure and frame for other components, such as one or more inspection elements 102 for multiple modalities fixed above a translation stage/table 103. Inspection elements 102 are pointed towards stage 103.

In one embodiment, scanning gantry 101 may be enclosed and sealed to the outside environment. Within scanning gantry 101 there may be one or more lights to illuminate sample 105. Scanning gantry 101 may also have inlet/outlets for conditioned air to control the temperature and humidity levels within the enclosure. Scanning gantry 101 may provide RF shielding so as to further insulate inspection elements 102 from interference, such as electrical interference, for example. The shielding may enable MIS 100 to control environmental factors such as interference, illumination, ambient temperature, and relative humidity. In some cases, these parameters may affect sensor results and calibration settings including optical focus and exposure time. Controlling such parameters may enable high repeatability in measurements for all modalities as well as lead to more accurate results.

In another example, scanning gantry 101 gantry may be open, and the parameters may be controlled in an external environment (e.g., room) of scanning gantry 101. In either configuration, enclosed or open scanning gantry 101, the environmental parameters may be recorded as part of the data capture process.

While FIG. 1 and FIG. 2 illustrate examples of MIS 100, other arrangements for MIS 100 may be employed. For example, stage 103 may be replaced by a stationary stage, and inspection elements 102 for a variety of modalities, each configured to move independent of the stationary table to acquire data regarding the sample. For example, one or more inspection elements 102 may each be attached to a single moveable rig with stepper motors, or each inspection element 102 may have its own set of stepper motors to facilitate movement. Additionally, or alternatively, stage 103 may be replaced by another type of support, such as a frame, that holds sample 105 by its peripheral edges allowing unobstructed views of both sides of sample 105 by the equipment of MIS 100.

In one example, sample 105 may comprise a PCB, or in some cases, two or more PCBs mounted together. The electronic components of the PCB may, for example, include integrated circuits (ICs), such as microprocessors, memory chips, field programmable gate arrays (FPGAs), or so forth. The electronic components of the PCB may also include lumped elements, such as resistors, capacitors, inductors, or so forth. The electronic components of the PCB may also include optoelectronic components, such as semiconductor lasers or light emitting diodes (LEDs), and may further be mounted on a PCB with lenses or mirrors.

Inspection elements 102 may comprise one or more sensors and additional hardware (e.g., a radiation source) necessary to enable each modality. A sensor may be interchangeable with an inspection element. The modalities of inspection may be: visible (VIS) (e.g., to capture surface features); terahertz (THz) spectroscopy (e.g., to capture sub-surface features); longwave infrared (LWIR); shortwave infrared (SWIR); laser profilometry (LP); electromagnetic interference (EMI) near field probing; and/or, Millimeter Wave (MMW) imaging. Examples of sensor/hardware names and specifications of each modality are listed in Table 1.

TABLE 1

Examples of Modality Sensor Details

| Modality | Instrument Name | Spectral Range (µm) | Lateral Resolution (µm) |
|---|---|---|---|
| VIS | FLIR Blackfly S | 0.4-0.8 | 6.5 |
| THz | TeraView EOTPR4000 | 100-1000 | 50.0 |
| LWIR | FLIR T530 | 7.5-14.0 | 70.6 |
| SWIR | Princeton Instruments NIRvana 640 | 0.9-1.7 | 11.6 |
| LP | Micro Epsilon ScanCONTROL 2950 | — | 23.1 |
| MMW | VTRIG-74 | 1000-10000 | 2000 |
| EMI | Langer XF-E 04s | 10000> | 1000 |

For any modality of MIS 100 that may use an array, such as the VIS modality, LWIR modality, SWIR modality, and/or MMW, sensor 102 may be considered to be directed on sample 105, and the coordinates may be oriented based on the FOV and the position of stepper motors 104.

For example, for LP modality, the sensor (i.e., laser) generates a line that may be scanned across the sample to capture single points with known coordinates. Accordingly, since the FOV and location of the sensor 102 relative to sample 105 may be known for all modalities, the data captured may be processed and positioned to create a mosaic, as further described herein.

In one example, the VIS, LWIR and SWIR data may be represented digitally as 24-bit, 16-bit and 8-bit values, respectively, at discrete x, y and z locations with physical spacing at the corresponding lateral resolution listed in Table 1. In one example, the LP location data may be saved as a list of 64-bit floating point x, y, z coordinate values as output by sensor 102 and stepper motors 104. These coordinate values may be converted to an orthographic image using two-dimensional binning at the lateral resolution limit to enable spatially-correlated comparison between samples.

In one example, Thz, EMI, and MMW data may be captured as an N-dimensional array of floating-point values. These values may be reduced in dimensionality to create orthographic images, similar to the aforementioned scenario of using LP. For EMI specifically, E- and H-field signals may be captured near the surface of the sample using a near-field probe and oscilloscope. The signal may be captured over a longer period of time (e.g., on the order of milliseconds) to observe lower frequency events.

Computing device 130 may control MIS 100 and provide the ability to process the data collected via MIS 100 generates as a result of operating inspection elements 102.

Figure 3:
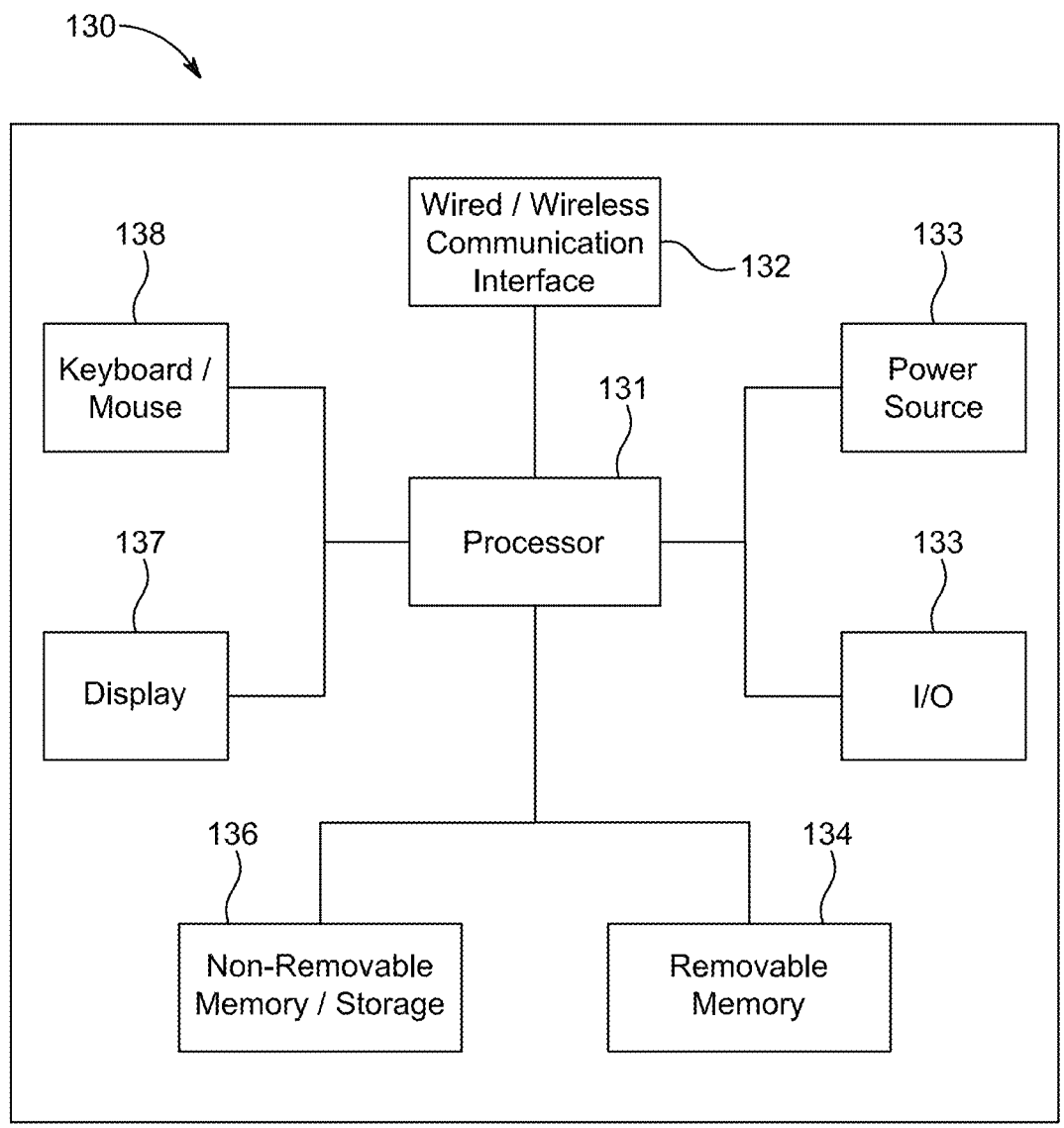
FIG. 3 illustrates an example computing device within the MIS.

FIG. 3 illustrates an example computing device 130 within MIS 100. Computing device 130 may connected to and/or include a processor 131, a wired or wireless communications interface 132, a power source 133, input and output (I/O) ports 133, 134 removable memory, 136 non-removable memory/storage, a display 137, and/or, peripherals for interacting with computing device 130, such as a keypad/mouse/touch screen 138. It will be appreciated that computing device 130 may include any sub-combination of the foregoing elements while remaining consistent with embodiments disclosed herein.

Processor 131 may be a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. Processor 131 may perform signal coding, data processing, power control, input/output processing, and/or any other functionality that enables computing device 130 to operate in concert with MIS 100. Processor 131 may be coupled to communications interface 132. While FIG. 3 depicts the different elements of computing device 130 as separate components, it will be appreciated that one or more components may be integrated together in an electronic package or chip.

Communications interface 132 may be configured with an 802.11 antenna to wirelessly transmit signals to and/or receive signals from an access point over an air interface. In one example, communications interface 132 may be configured with an ethernet port to conduct wired communication. In other cases, communications interface 132 may utilize other forms of wireless communication, such as IR, UV, or visible light signals, Bluetooth, cellular radio (e.g., 3G, 4G, 5G, etc.).

Processor 131 may be coupled to, and may receive user input data from, keyboard/mouse/trackpad 138 and/or display/touchpad 137 (e.g., a liquid crystal display (LCD) display unit or organic light-emitting diode (OLED) display unit). Processor 131 may also output user data to display/touchpad 128. In addition, processor 131 may access information from, and store data in, any type of suitable memory, such as non-removable memory/storage 136 (e.g., RAM, ROM, SSD, NVME, HD, etc.), and/or removable memory 134. Removable memory 132 may include a memory stick, a secure digital (SD) memory card, and the like. In other embodiments, processor 131 may access information from, and store data in, memory that is not physically located on computing device 130, such as on a server or a remote storage point (not shown).

Processor 131 may receive power from power source 133, and may be configured to distribute and/or control the power to the other components in computing device 130. Power source 133 may be any suitable source of power, such as one or more batteries, or an electrical outlet appropriate for the region.

As computing device 130 relates to the example MIS 100 of FIG. 1, computing device 130 may be operatively connected to one or inspection elements 102 via an input/output port 133 (e.g., USB, etc.). Processor 131 may receive and process the data received and store it in the plurality of memory/storage options of computing device 130. In addition to inspection elements 102, computing device 130 may be operatively connected to other sensors, or, may be internally connected to processor 131. These other sensors, not shown, may include one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

Any method, or combination of methods, discussed herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

As it relates to FIG. 3, to provide for the operation of MIS 100, processor 131 may control sensors 102 and translation table 103 to acquire multimodal image data of sample 105; and to perform various data processing and analysis on the multimodal data as disclosed herein. Typically, display 137 may be integrated with or operatively connected with processor 131 to display the images and/or reports as a result of the aforementioned operations performed by processor 131 for inspection of sample 105.

Figure 4:
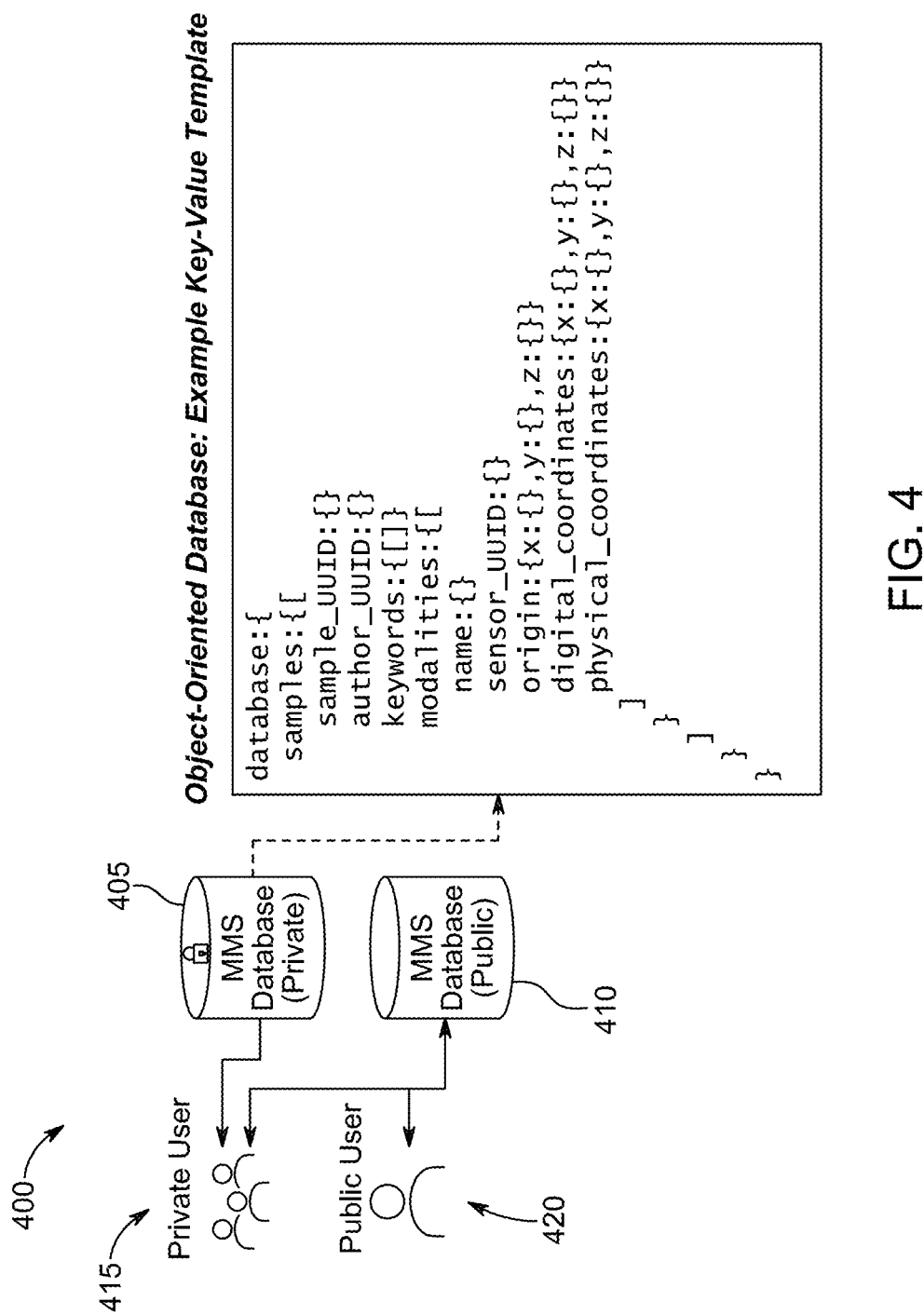
FIG. 4 illustrates a database that may be within computing device of the MIS.

FIG. 4 illustrates a database 400 that may be within computing device 130. Database 400 may be within non-removable memory/storage 136, for example. Database 400 may include entries of physical object multimodal signatures. The signatures may include two-dimensional and three-dimensional images along with any associated metadata. These images enable reconstruction of an object through spatial correlation of one or more modalities. A single entry in database 400 may include a universally unique identifier (UUID) for the sample, an author UUID, keywords for natural language searchable functionality, and image modality data. Within a sample entry, an individual modality may include the modality name, a sensor UUID, the relative origin of the physical coordinate system in physical units, and digital-physical coordinate pairs to enable homographic transformation of the modality with others. Database 400 may be an object-oriented database with public 410 and private 405 entries. Users, both public 420 and private 415, may access database 400 through a search engine and browser on a web or desktop software client. Authorized users may contribute and download multimodal signatures at the appropriate level of access.

For computer vision and machine learning, a shift may occur toward problem solving in multimodal space going beyond the single modality, namely visible imagery space. Large sets of multimodal images may be created and shared using database 400 enabling research and advancement of the field. A standard format for the multimodal signature (MMS) may be used. Database 400 may host the MMSes with additional metadata to support accessibility of users. The standardized format ensures a lossless transition of data between data acquisition system allowing laboratories and users to share multimodal signatures without the need to align the data each time and without the need to have special instructions for accessing and combining multiple signatures in an optimized way.

Figure 5:
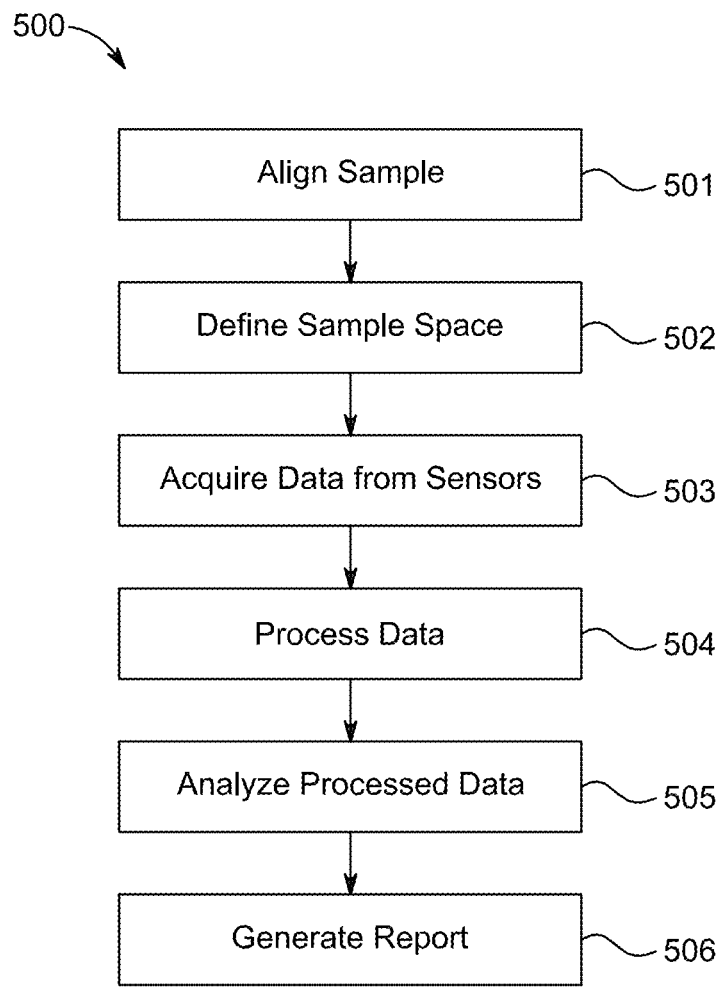
FIG. 5 illustrates an example method for the MIS of FIG. 1.

FIG. 5 illustrates an example method 500 for MIS 100. Method 500 provides a series of steps, but a person of ordinary skill in the art will appreciate that one or more steps may be optional and/or performed in a different order then what is presented. At some point prior to method 500, sample 105 may be fixed to stage 103. Alternatively, stage 103 may comprise of a conveyor belt such that there may be a flow of samples that pass-through MIS 100.

At step 501, MIS 100 may be initialized. Initialization may include the general alignment and initial recording of position information of MIS 100 and the associated components. For example, the initialization may include positioning all of the sensors and related hardware so that their primary axis (z-direction) is orthogonal to the sample plane (x y plane). After the positioning, a single Cartesian origin may be defined in the stepper motor space. In some cases, the relative translational offset between the origin and a primary axis of a sensor may be defined in the motor space. In some cases, the sensor(s) FOV may be defined in pixel space.

In one case, the sample may be aligned with respect to one or more of the sensors of the inspection elements. In one example, aligning the sample may include aligning the stage upon which the sample is attached, which may be moved via the stepper motors. Alternatively, the sample may be aligned manually when it is attached to the stage so that the stepper motors may be zeroed wherever the sample is placed.

Once aligned, the initial location data of the stepper motors may be captured and stored enabling the MIS to know where each sensor is with respect to the sample. The sample may be aligned rectilinearly with the stage and sensors. In one example, the origin of the sample is placed in the center of the FOV of the VIS sensor using coarse and fine motor control adjustments of the stepper motors. Additionally, or alternatively, the sample may be aligned with a fixed point of the stage in the FOV of one or more sensors and within an operating range of the stepper motors.

At step 502, the dimensions of intended physical space to be captured by the sensors may be configured. This space to be captured may be smaller than the actual sample, which means that multiple captures by a given sensor may be needed in order to ensure the entire sample is captured. In some cases, the space to be captured may be larger than the actual sample, which means that windowing may need to occur after the data capture.

At step 503, each sensor may acquire/capture data to generate a modal signature for each modality. As discussed herein, a modal signature of a sample refers to the response of a particular sensor when the entire sample is inside its FOV. Generally, Cartesian capture locations in motor space may be defined. Such locations may be based on the modality FOV and the relative offset. The stepper motor may then move to some point in the Cartesian space (i, j) where the sensor of the modality captures data. This capture may represent a subsection of the area to be captured. The data may be saved along with the corresponding location (i, j). This capture process may be repeated based on the stepper motors moving the sample in some predetermined increment. The stepper motors may move in discrete steps, such as by fractions of a degree of rotation. These steps may be converted into a precise distance moved in a Cartesian stepper space. In one example, the stepper motor may move 1 inch every 2000 steps.

A multimodal data set of the sample may be generated assembling data for the modalities acquired/captured. In some cases, the data associated with multiple modalities may be captured sequentially or concurrently. The multimodal data set may be stored in the removable and/or non-removable memory.

In one example, a modal signature may be one or more images of the sample, where the images may include a margin around the sample. In one example, the modal signature may be a set of data representative of the output from a sensor captured with the help of another inspection element (e.g., light source, heat source, etc.).

In some instances, the data acquisition step may occur over a period of time. In one example, the data acquisition may include multiple stages, with an initial stage and additional stages following sequentially thereafter, as necessary. In this example, one of the additional stages may include physically adding/replacing a sensor to the scanning gantry, or by changing data acquisition parameters, such as illumination and sample temperature for a sensor that is in use. In one example, for the LWIR modality power may be provided to the sample (e.g., PCB) over time so that steady state thermal emissions of the sample may be captured and stored as a functional emissive LWIR modality to provide distinctly different information then passive LWIR data. In one example, the EMI modality may capture data over a period of milliseconds recording E and H fields near the surface of the sample.

In some cases, the entire sample may not be captured by a modality due to sensor array size limitations, however, spatial correlation, such as image stitching and data registration may be employed, as described herein, to create a modal signature that is complete by fusing subsets of data (e.g., tiles) that are captured with a known overlap in physical space.

At step 504, captured data may go through the process of spatially correlating the captured data to generate a final data set to be analyzed. This final data set may be representative of multiple layers of information from the different modalities. The processing may include one or more steps for spatial correlation that are described further herein. Raster stitching may be used for offset correction and combining data. In one case, raster stitching may be performed for offset correction and combining data of one modality. In one case, raster stitching may be performed to combine the data from more than one modality. The processing may also include alignment to address any rotational/translation/scaling issues as compared to a reference data set from a modality.

In an example, a sample may be a PCB board placed at the center of the stage, and the center of the PCB board may be the origin for an xy coordinate system to determine where to align tiles of images. In another example, the origin may be a corner of the sample, such as the bottom left, to generate positive x, y values for any coordinate in the sample. In some cases, the tiles may overlap if the images are taken with portions of the image already captured in a prior image, and the tiles may need to be stitched together.

In an example, a sensor may capture one or more images, which may be referred to herein as tiles of images. These tiles/images may make up a data set of a particular modality (e.g., VIS). With these tiles, location information is also known enabling the tiles to be stitched together to form a mosaic with precise dimensions and reference points. For example, tiles of image from the VIS sensor may captured and stitched together to form a mosaic that visually contains the entire sample.

At step 505, the final data set is analyzed using various types of machine learning and other techniques. In one example, the analysis may have an objective of detecting anomalies of a COTS PCB.

At step 506, a report, or other output, may be generated based on the analysis. Generally, the report may summarize a number of facts and/or conclusions determined based on the one or more steps in the example method of FIG. 5. In some cases, there may be critical information listed in the report. Critical information may include one or more of the following: Raw image data (e.g., 2d, 3d, 4d, etc.) in any standard format (e.g., csv, data frame, hdf5, pickle, etc.); Relationships between any segmented data files so they can later be aggregated; Transformation metadata that can be used to spatially correlate the raw image data (e.g., origin, rotation, translation, scaling, normalization constants, etc.); Software version number; Inspection elements that were used and related information (e.g., sensor type, model, hardware, radiation sources, etc.); Inspection element Hardware condition (e.g., for calibration); and/or, timing aspects (e.g., to monitor throughput). The report may be presented on a screen of computing device 130, delivered to an email address, sent as a compressed and/or encrypted file, or similar methodologies.

Figure 6:
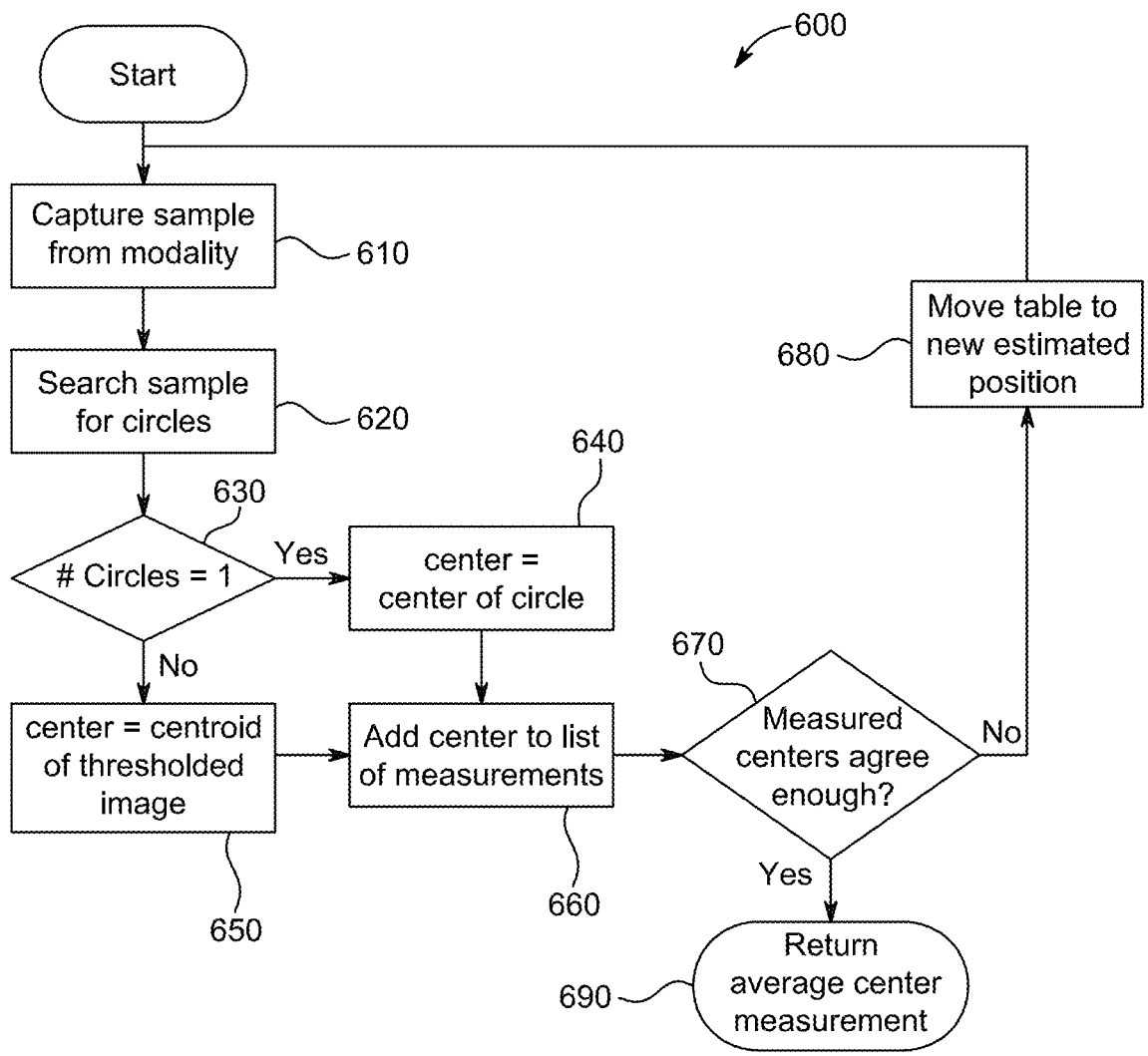
FIG. 6 illustrates a method for automated calibration of multimodal sensors of the MIS of FIG. 1.

FIG. 6 illustrates a method 600 for automated calibration of multimodal sensors of MIS 100 of FIG. 1 to determine physical position of the sample. A common calibration target has been designed to be visible in multiple modalities of a multimodal scanner. The ability to observe the target in each modality allows correlation of the modalities. The parameters of MIS 100 may be determined including sensor offset, sensor tilt and overall warping.

The calibration target is a PCB with a single exposed circle pad and black solder mask. The physical properties of the pad and board allow the edge between the pad and board to be "viewable" in each of the modalities.

In current systems, sensor offset has been measured manually. Such manual measurements limits accuracy while taking time. To align modalities, an operator may be involved to view a common object in two or more modalities and compute the offset.

Figure 7A:
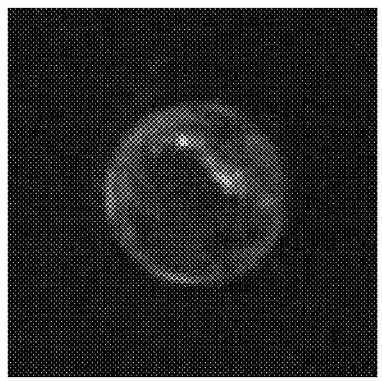
FIG. 7 (the collection of FIGS. 7A-7D) illustrates the image in each of two modalities (FIG. 7A, FIG. 7C) and the respective center detection of each (FIG. 7B, FIG. 7D) of the target illustrating the pad and the center of the pad.
Figure 7B:
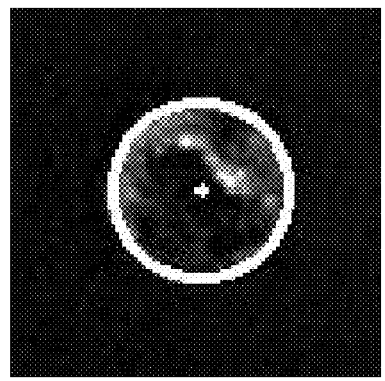
Figure 7C:
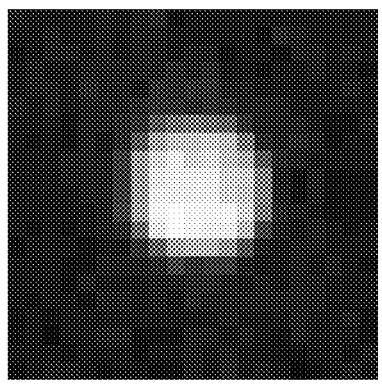
Figure 7D:
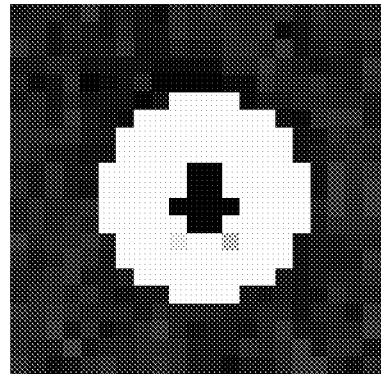

Method 600 utilizes the sensors perspective "viewing" a known calibration target to determine parameters of interest quickly and accurately. To locate the same point on two or more modalities, the edge between the pad and PCB of the calibration target may be observed in each modality. To find the center of the pad (the desired point), an estimate circle is determined from the captured data as illustrated in FIG. 7. FIG. 7 illustrates the image in each of two modalities (FIG. 7A, FIG. 7C) and the respective center detection of each (FIG. 7B, FIG. 7D) of the target illustrating the pad and the center of the pad. In FIG. 7A the visual modality is illustrated. In conjunction with FIG. 7B there is illustrated the center detection in the visual modality. In FIG. 7C the LWIR modality is illustrated. In conjunction with FIG. 7D there is illustrated the center detection in the LWIR modality.

Method 600 includes capturing a sample from at least one modality at step 610. At step 620, method 600 includes searching the captured sample for circles. This may include the samples in FIGS. 7A and 7C, for example. The localization method centers around the edge between the pad and the PCB on the calibration target. When the sensor determines the edge is observed, a Hough transform is used to detect the circle that provides that edge. At step 630 a determination is made is the number of circles equal 1. If the Hough transform fails to detect a circle, the centroid of a threshold image is used as a rough estimate. If the determination of step 630 is in the affirmative, step 640 centers the circles in the center of the image. If the determination of step 630 is in the negative, step 650 determines the center of the centroid of the threshold image. After the center of the pad is determined, the table moves the target to center the pad under the sensor. From this new position, the sensor may make a new estimate that increases the accuracy because the pad is more centered than previous positions. The center estimates may be saved and the process may iterate until the center estimates agree within a predefined threshold.

After step 640 and step 650 have found the center of the image, the center is added to a list of measurements at step 660. At step 670, a determination is made whether the centers of the multimodalities agree. If the centers agree in step 670, the average center measurement is returned at step 690. If the centers do not agree in step 670, the table is moved to a new estimated position at step 680 and the method resets to step 610.

The scanner moves to center the sensor over the estimated circle. The sensor then captures again and a new circle is estimated. And the estimate becomes more accurate. Through method 600, the center of each sensor perspective may be determined automatically and quickly. In order to determine the sensor offset, the sensor centers may be compared. To determine other parameters including tilt and warp, multiple samples may be images with the calibration target in various positions. Resulting from the knowledge of the physical position of each sample, a determination may be made to transform from the perspective of the sensor into the physical space.

Figure 8:
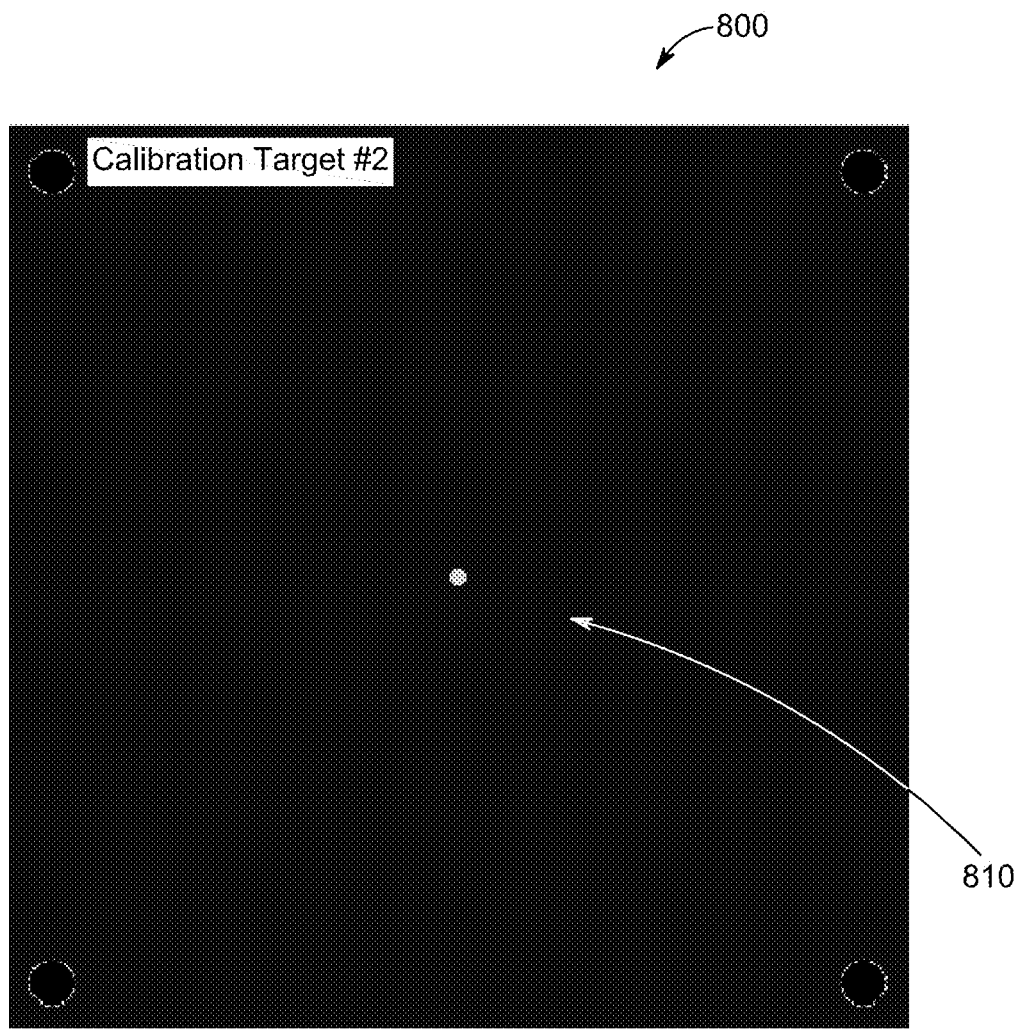
FIG. 8 illustrates a calibration target of the MIS of FIG. 1.

FIG. 8 illustrates a calibration target 800 of MIS 100 of FIG. 1. Target 800 is designed to appear in all of the modalities. The metal 810 of the pad of target 800 appears in a discernable way in all modalities from the black solder mask. In the visible spectrum illustrated in FIG. 7A, the pad appears to be light and the black solder mask appears dark. In LWIR illustrated in FIG. 7C, the pad reflects while the black solder mask absorbs.

Figure 9:
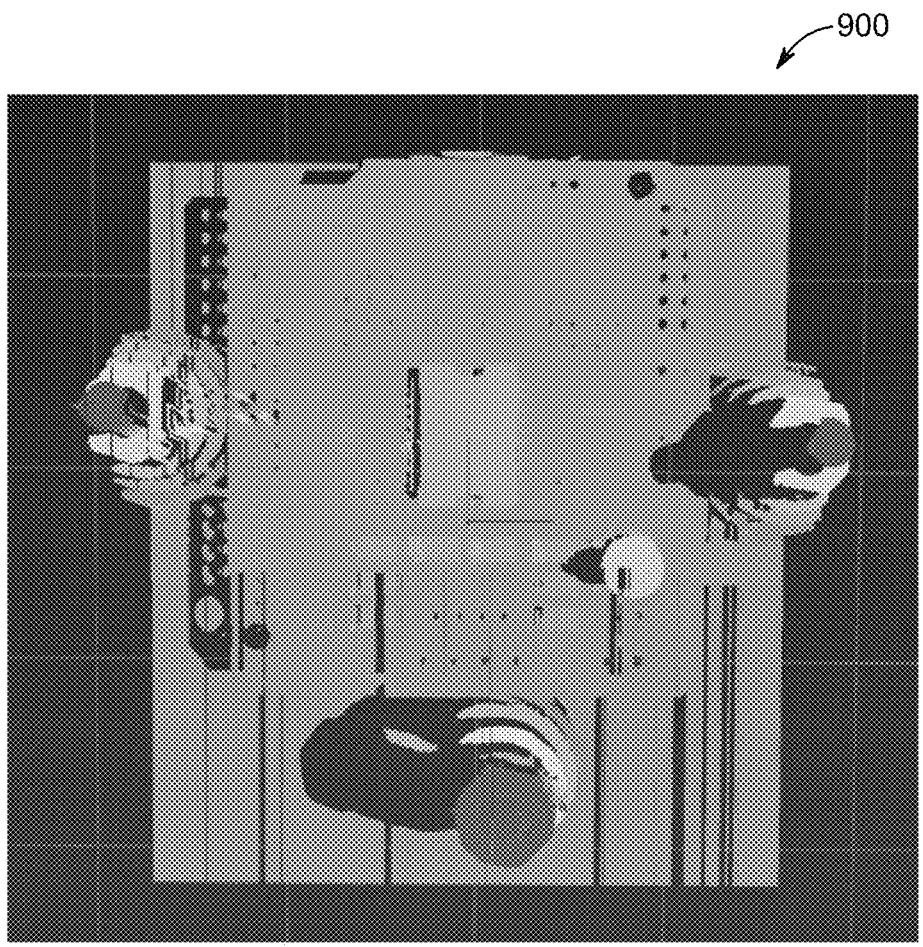
FIG. 9 illustrates a magnetic PCB holder.

FIG. 9 illustrates a magnetic PCB holder 900. Magnetic PCB holder 900 functions to hold the sample for testing. Magnetic PCB holder 900 blocks a portion of the sample and/or extends above the sample causing illumination distortion.

Figure 10:
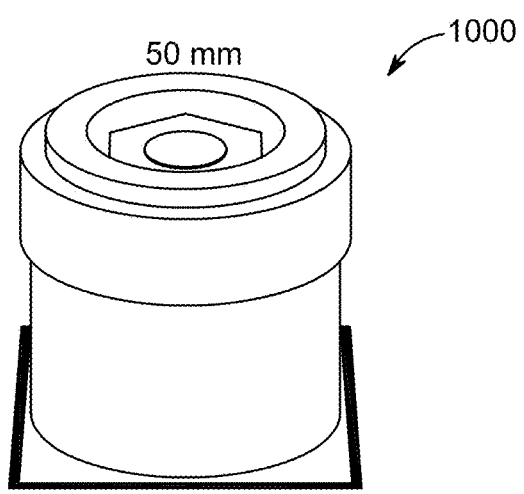
FIG. 10 illustrates a magnetically mounted, equally raised structure to secure a sample for test during inspection in the MIS of FIG. 1.

FIG. 10 illustrates a magnetically mounted, equally raised structure 1000 to secure a sample for test during inspection in MIS 100 of FIG. 1. In the multimodal PCB inspection involving multiple cameras with different focal distances and illumination sources, structure 1000 may be used to secure and elevate the PCB to a position allowing a constant focal length for each camera and minimally extend above the plane of the PCB to prevent casting of shadows from illumination sources and obstructing the PCB. Structure 100 may be magnetic allowing to rigidly secure the sample.

Figure 11:
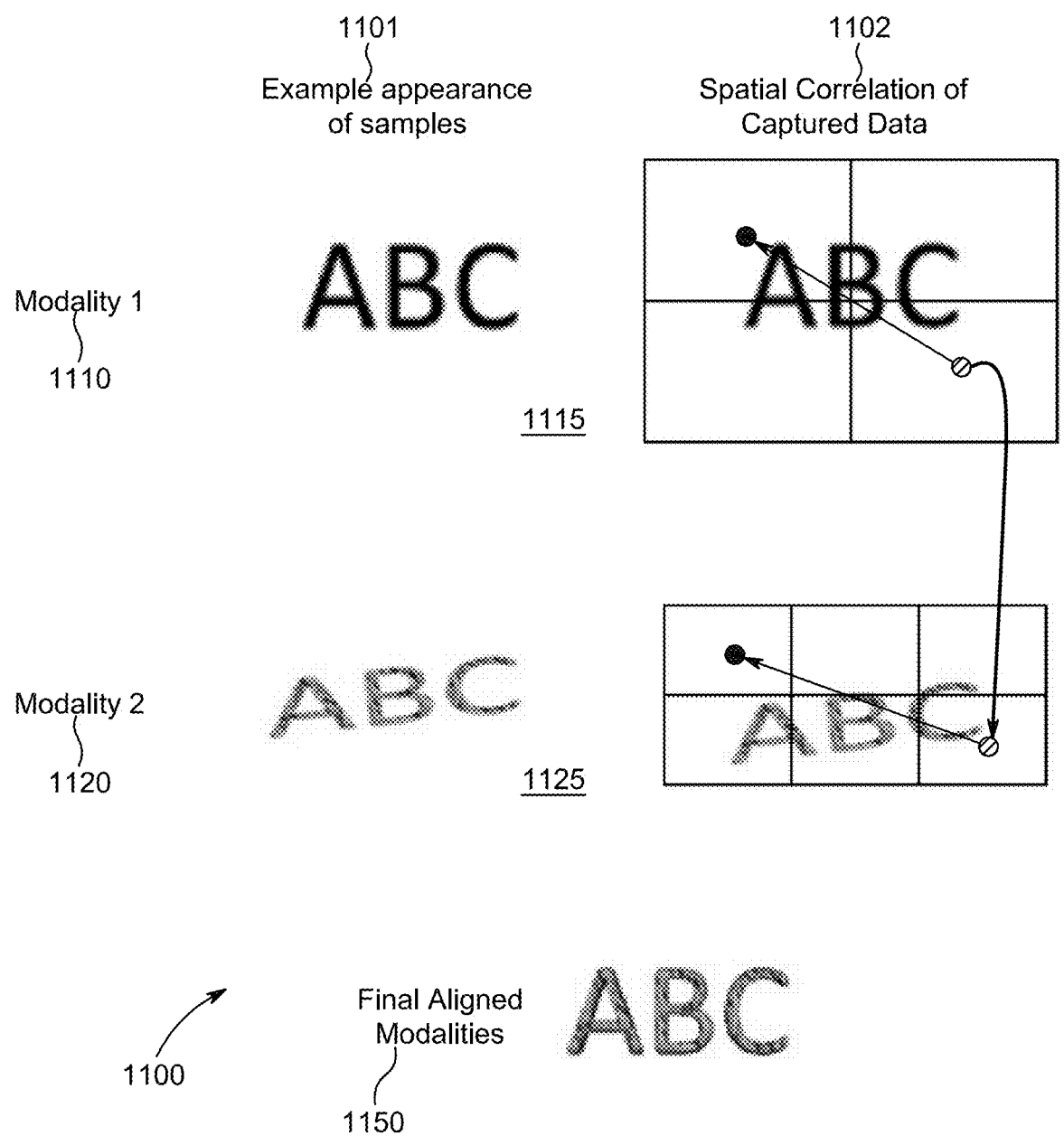
FIG. 11 illustrates an illustration of an example spatial correlation process.

FIG. 11 illustrates an example spatial correlation process 1100. For illustration purposes, the sample is the letters ABC. The sample may take up some three-dimensional space atop a table/stage underneath inspection elements (e.g., as shown in FIG. 1). Initially, the captured data of a particular modality is stitched (i.e., registered) together. Raster stitching may be used by employing a panoramic image registry function that makes a best estimate as to where the tiles of a modality go without consideration of the location information or with some consideration of location awareness but without consideration of the specific stepper motor location information. There may be outliers within the data that represent clear errors.

For example, the offsets of each tile may have been combined without creating a grid because of how they were captured. The raster stitching may include a correction step that may mitigate any stitching error(s) that may occur by fitting the stitched image to a two-dimensional grid. This grid may include known interval offsets and global rotation as determined statistically from the output of the panoramic image registry function. In some cases, the grid may already be partially formed by the rest of the data set using the location data. In some cases, reference points, location information, and dimensions of the sample captured during data acquisition may be used to correlate the tiles of the captured image data. Given the known reference points and dimensions, the image data may be manipulated and dynamically mapped to achieve a dimensionally uniform output among the modalities collected.

For each modality, as part of the stitching process, the Cartesian location of the centers of the stitched tiles, in pixel space, may be saved. The center location of each tiles is also known in the stepper motor coordinates from known when the data was captured. Based on this information, the rotation of the modality relative to the stepper motors may be determined. Also, the relative spatial sampling rate (e.g., DPI) of the modality in x and y axes may also be determined.

Having this information for each modality, then the relative offset between modalities may also be determined.

For at least one modality, the pointing direction of the sensor may be orthogonal to the plane of the sample configuring the captured image orthogonal to the direction of the sensor (e.g., the plane of the sample may be parallel to the plane of the sensor). For example, for the VIS modality a telecentric lens may be used so that the projection of the FOV is flat to ensure that the VIS image data is orthogonal to the plane of the sample relative to the direction of the VIS sensor. In other cases, a non-telecentric lens may be used, however further spatial correlation may be required to ensure the relative distance of any given point in an image is the same.

As seen in FIG. 11, there are two examples of an appearance of an entire sample 1101 as captured using two modalities—Modality 1 1110 and Modality 2 1120. These two examples 1110, 1120 may have been captured in tiles and require spatial correlation 1102. A grid of tiles may have been stitched together from the captured data for each modality. In this example, Modality 2 1120 having six captures 1125 during data acquisition results in a 3×2 grid, and Modality 1 1110 having four captures 1115 during data acquisition resulting in a 2×2 grid. In this example, Modality 1 1110 may be the reference image where the sensor was orthogonal to the plane of the sample (e.g., the ABC appear uniform and consistent). Further, the sensor of Modality 2 1120 may have captured using a sensor with a different DPI and different three-dimensional rotational angle than Modality 1 1110 (e.g., the ABC appears skewed compared to that of Modality 1).

After stitching, the images from multiple modalities may undergo alignment. One modality may be used as a reference. Aligning an image may use the aforementioned rotation information and sampling rates to perform an affine transform (e.g., rotation and xy translation, vector algebra) on the other modalities, to align the modalities. After alignment of the modalities, the images may require scaling and windowing. The captured data may be window-filtered to remove any margin and to isolate the sample in a given physical space.

In one example, window-filtering may be achieved by separating the sample and stage in the modalities using LP data and its associated location data. LP data may be the least affected by the color of the sample and stage, and with the location data uniform across modalities because of the precise nature of the stepper motor location information, the LP data may be oriented with the other modalities to perform the window-filtering. The resulting window-filtered data may be processed to achieve a composite data set of the modalities.

As seen in FIG. 11, the final aligned modalities of the sample appear uniform. Both Modality 1 1110 and Modality 2 1120 are intended to be illustrated superimposed 1150 over each other such that their size and two-dimensional scale are the same (i.e., the illustration may appear to be Modality 2, but Modality 1 is intended to be directly beneath Modality 2 in a lower layer). The data sets of each modality may be aligned and spatially correlated.

In some cases, sub-pixel alignment may be needed. Specifically, where two images may be misaligned by a small but non-negligible amount, sub-pixel alignment may be performed once the misalignment has been determined (e.g., determining a Cartesian shift) using phase shift analysis in two dimensional spatial Fourier transformed space.

Figure 12:
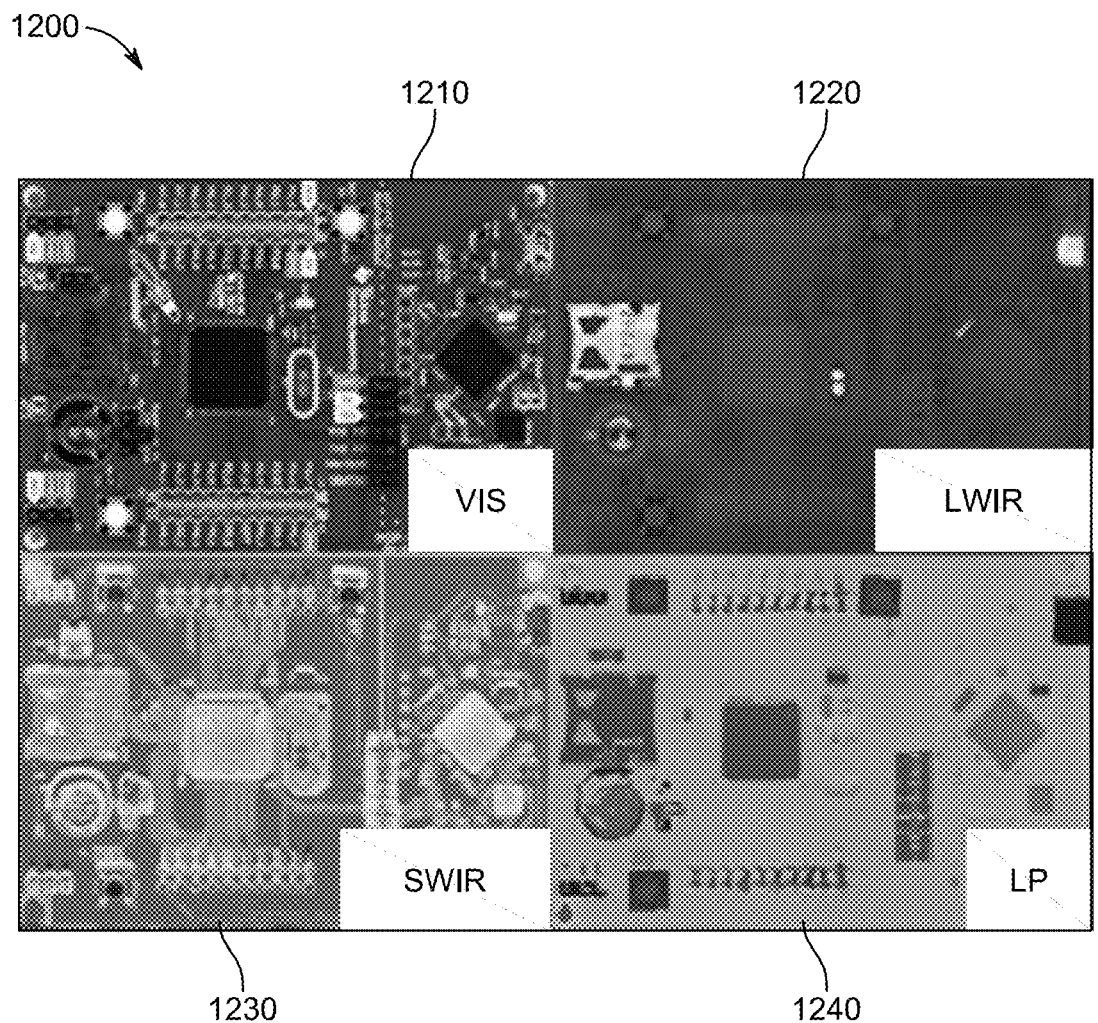
FIG. 12 illustrates an example data set of different modalities of a sample, such as a PCB.

FIG. 12 illustrates an example data set of different modalities of a sample 1200, such as a PCB. This example data set is presented as a color map. The modalities captured include Visual (VIS) 1210, Longwave Infrared (LWIR) 1220, Shortwave Infrared (SWIR) 1230 and Laser Profilometry (LP) 1240 with a uniform perspective across the images. The colormaps emphasize the strength of each modality. While VIS data 1210 may provide color information in the visible spectrum, LWIR 1220 may provide the location and diversity of materials including exposed metals, SWIR 1230 may provide the location of covered traces regardless of color contrast in the visible spectrum, and LP 1240 may provide the height of all components present on the board.

In some cases, as multimodal data is captured for COTS devices, data may be stored in a hierarchy indicating product type, maker, model and series number in the case of duplicate samples. If known modifications to the device(s) exist, these modifications may be marked and stored as a binary bitmap where true values indicate the location of an anomaly for machine learning algorithm training purposes. Additionally, if the design files are available for the COTS device, these design files may be stored in the same place as the corresponding multimodal signature data.

Figure 13:
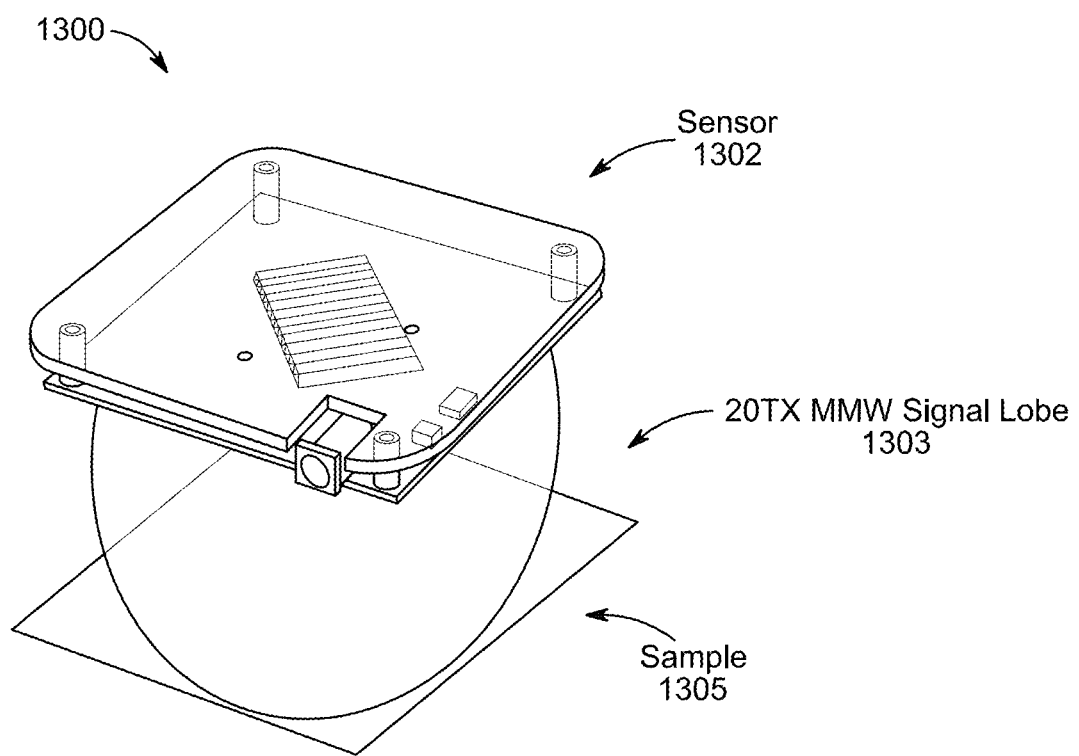
FIG. 13 illustrates an example of millimeter wave (MMW) radar modality used as one of the sensors in the MIS of FIG. 1.

FIG. 13 illustrates an example of millimeter wave (MMW) radar modality 1300 used as one of the sensors in MIS 100 of FIG. 1. Generally, MMW is a type of radar technology that uses short-wavelength electromagnetic waves. As an implementation of radar, the electromagnetic waves may be transmitted to determine if there are objects of a specific limited composition in the path of the signal/lobe. If objects exist in the path, at least a portion of the electromagnetic waves may be reflected (e.g., objects made of materials that MMW do not pass through). MMW radar receives the reflected signal, and based on the received signal, a tile of data is accumulated. Such a radar modality may be repeated in a grid formation acquiring tiles of data that cover the entire sample.

As illustrated in FIG. 13, an MMW sensor 1302 may comprise of a transceiver for transmitting and receiving short-wavelength signals (e.g., MMW signal lobe 1303). The transceiver may include an array of one or more antennas (e.g., 20 TX and 20 RX elements, also known as multi-in multi-out (MIMO) array radar). The signal(s) 1303 may reflect off of a sample, or a portion of a sample, and at least part of the reflected signal may be received by the sensor 1302 during data capture. Whether the signal reflects off of a portion of the sample or the entire sample depends on the field of view of sensors 1302 as compared to the size of sample 1305. When the motion of sample 1305 is static, the recorded reflection is stable and consistent over repeated captures of data. When an object with a characteristic dimension near 1 millimeter or larger is either introduced or removed to the capture space, a perturbation in the received signal as compared to the original data capture may be discerned. The data capture of each perturbation may be used to classify one or more anomalies in a set of similar data captures. When MMW sensor 1302 is used at very close range (e.g., 0-184 mm), the MMW radar may perceive objects with sub-millimeter resolution.

Figure 14:
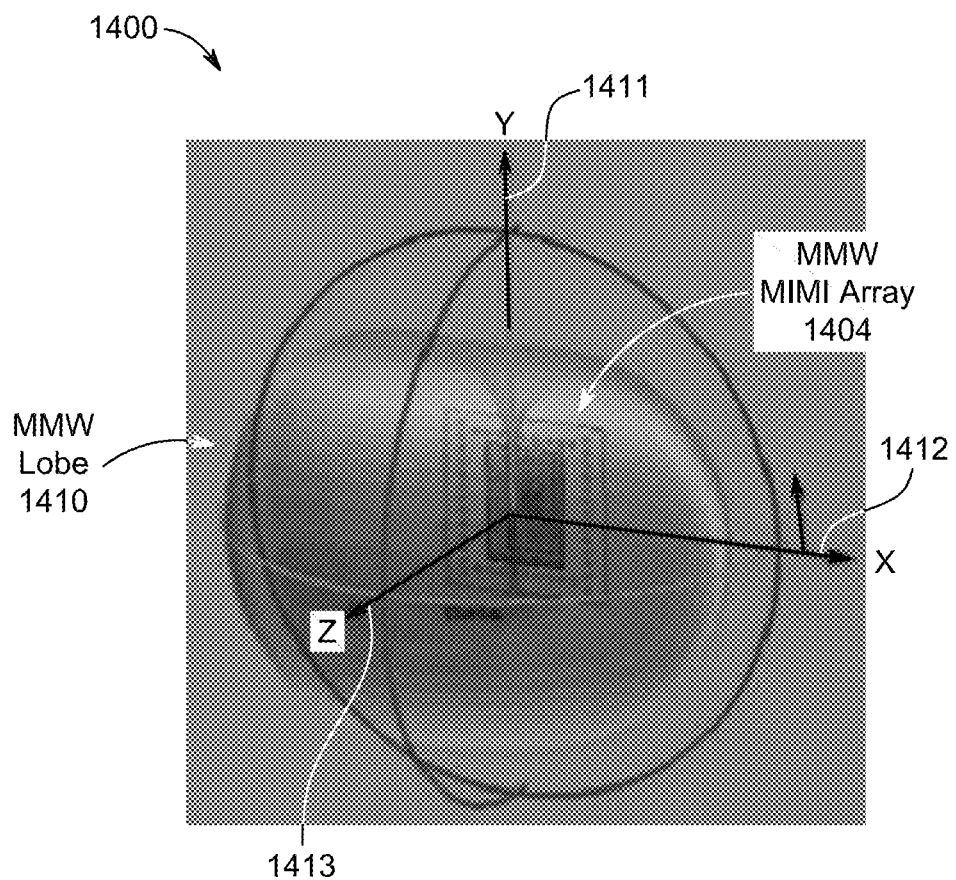
FIG. 14 illustrates an example of an MMW radiation pattern (e.g., signal lobe)

FIG. 14 illustrates an example of an MMW radiation pattern (e.g., signal lobe) 1400. The MMW MIMO array 1404 may emit a three-dimensional lobe 1410. The x, y, and z axes are illustrated for illustration purposes only. Generally, as used herein MMW radar may not be able to resolve details in Euclidean space. MMW radar may provide a consistent signature that may encode the surface and subsurface geometric information specific to a given sample as is described herein. In one example, data capture from a MMW modality may be dissected into increments of 21.4 mm, and progressively increase until 183.6 mm (e.g., FIGS. 17 and 18). The reflected signal may be able to provide information on elements in the path of signal (lobe) 1400 including information at different points in the signal where points may be considered to be ranging in distance from the sensor, or height from an impermeable/reflective surface, or the limit of signal lobe 1400. The information deduced by the data captured via the radar may also include information about anything within the lobe, meaning that unlike LP, for example, information is gathered about a three-dimensional volume. This three-dimensional volume information may be parsed and dissected for processing and/or analysis as described herein.

In one example, in the process of identifying anomalous features in PCBs, THz and MMW electromagnetic signals may be capable of imaging subsurface features in a PCB. While THz offers higher resolution, the optomechanical system required to capture THz images may be expensive, require greater relative maintenance, and may not be as easily deployable. In contrast, MMW radar may be affordable, robust, and highly portable. MMW may also comparatively lack spatial resolution when used as an image sensor. The reflected signal received from MMW radar may be heavily processed to fit the signal into the form of a spatially-correlated image. In some cases, this fitting may occur at the cost of data loss. By detecting statistical anomalies on the raw data with no spatial assumption, a MMW radar sensor may perceive changes in instances of data capture that include MMW-transparent materials, such as with PCBs at close range.

Figure 15:
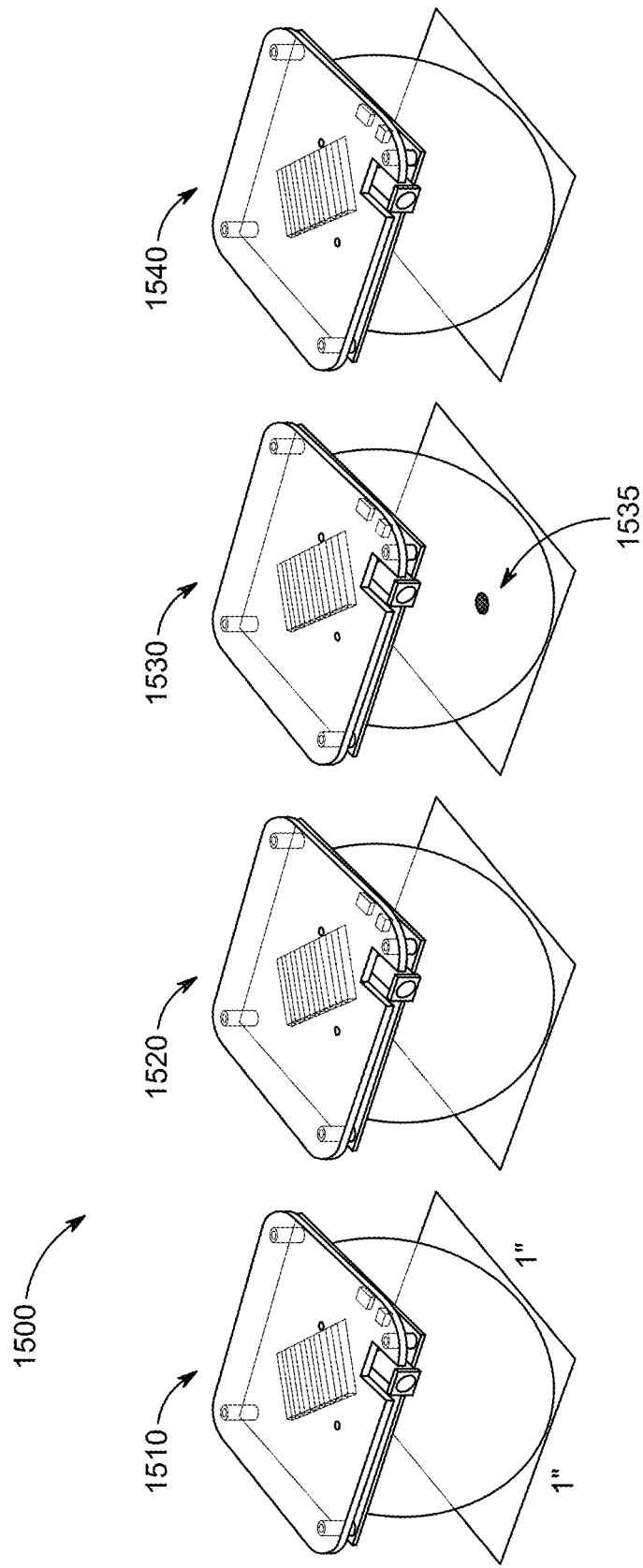
FIG. 15 illustrates a series of images depicting points in an example method for testing the MMW modality for detecting anomalies.

FIG. 15 illustrates a series of images 1500 depicting points in an example method for testing the MMW modality for detecting anomalies. The MMW signature may be captured from a PCB using MIS (a.k.a. RAICS) as illustrated in image 1510. The signature via the captures may be repeated to characterize repeatability as illustrated in image 1520. A small sized anomaly 1535, such as less than 1 mm, for example, may be introduced on the PCB in order to test the MMW approach for detecting such anomalies as illustrated in image 1530. The introduction of the anomaly may simulate, such as size, location and type of anomaly, the anomalies being detected when inspecting a plurality of PCBs. The anomaly 1535 may be removed and the control configuration may be remeasured to confirm recovery as illustrated in image 1540. By comparing the four measurements in image 1510, image 1520, image 1530 and image 1540, expected values and differences may be determined.

Figure 16:
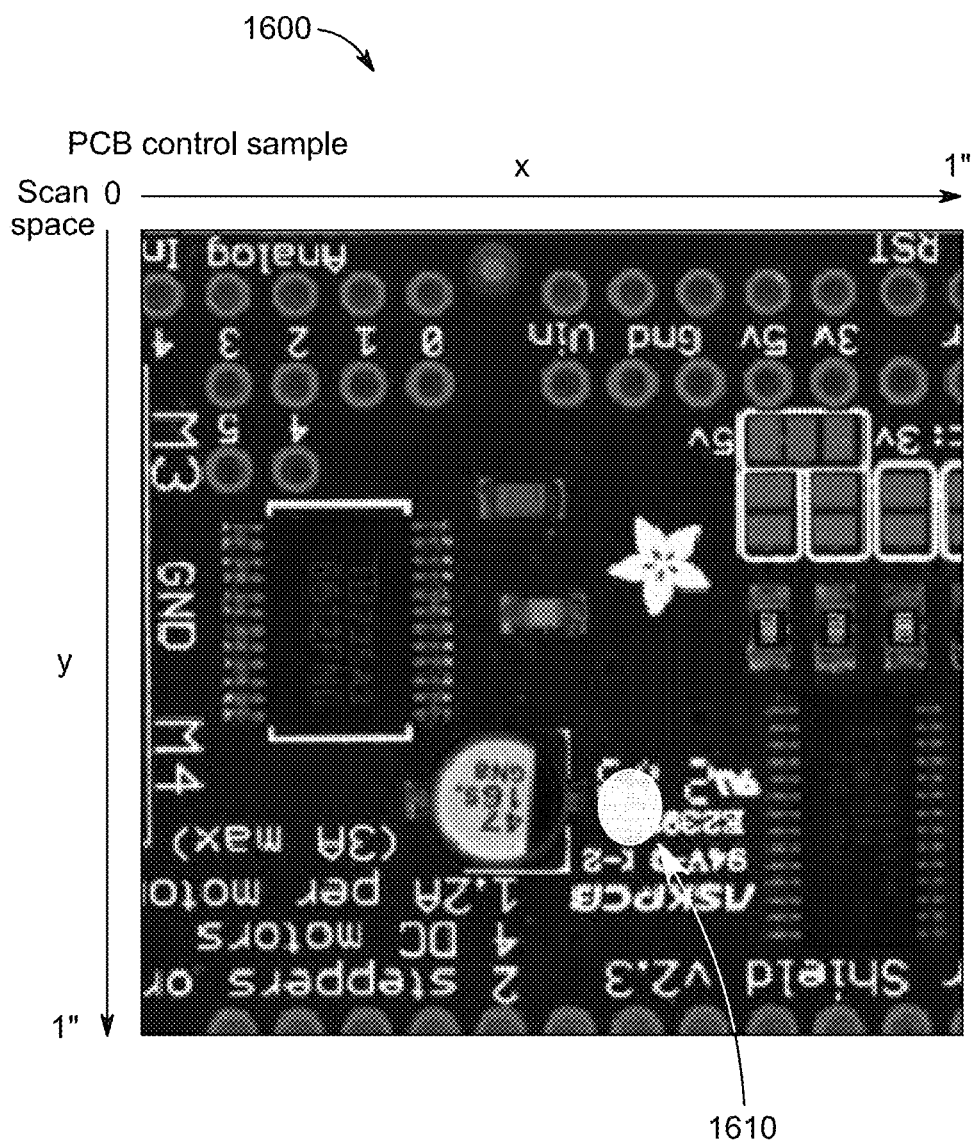
FIG. 16 illustrates a sample of a PCB with an anomaly.

FIG. 16 illustrates a sample of a PCB 1600 with an anomaly 1610. Anomaly 1610 may be a small piece of aluminum (Al). Anomaly 1610 may cause a perturbation in the MMW signature. After the anomalous MMW signature is captured, the MMW signature may be captured again with anomaly 1610 removed in order to confirm the originally captured signature. By comparing the captured anomalous MMW signature and the signatures without anomaly 1610, MIS 100 approach may be tested and verified, and/or to create training data for machine learning to detect other anomalies. As would be understood to those possessing an ordinary skill in the art, the approach for MMW testing may differ from actual MMW data capture, because in normal operation anomaly 1610 is not known to exist, and the purpose of MIS 100 would be to detect such anomalies 1610.

The raw data for an MMW radar may be a Quadrature signal (IQ) data. IQ signal may be I+jQ, where I is a real number, j is a complex number, and Q is an imaginary number. The magnitude may be calculated via Magnitude= $\sqrt{I^2+Q^2}$. In processing the raw data to convert I and Q components into a signal value, a pixel in antenna space may be presented. In some instances, the data captures from an MMW sensor may be subjected to additional and/or different processing than that described, and the raw data may be analyzed using machine learning.

Figure 17:
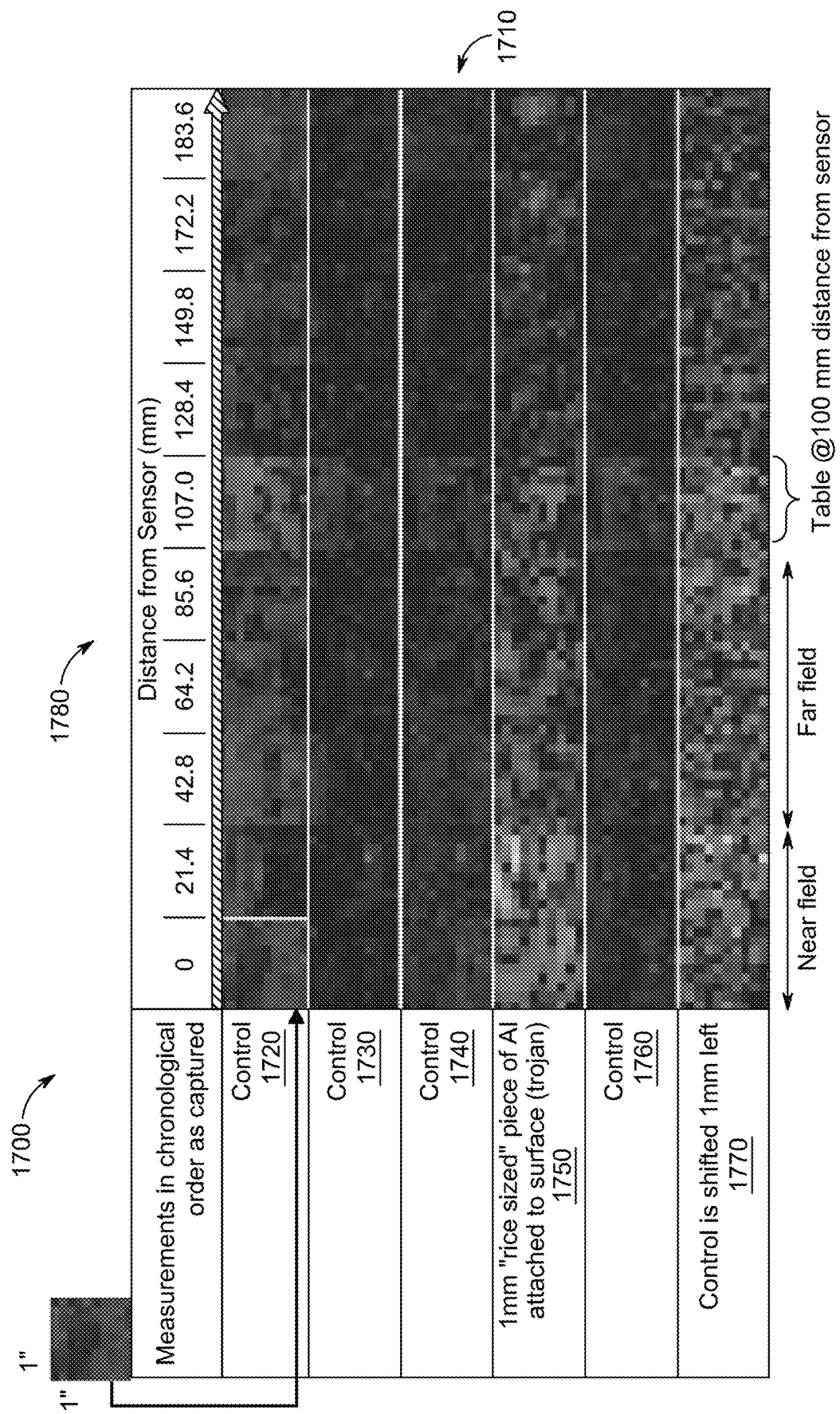
FIG. 17 illustrates an example approach that may be used to determine the best configuration for an MMW radar data capture and analysis in an MIS.

FIG. 17 illustrates an example approach 1700 that may be used to determine the best configuration for an MMW radar data capture and analysis in an MIS. The data has been captured in multiple instances as shown in each row 1710. The first row may include control 1720. The second row may include control 1730. The third row may include control 1740. The fourth row may include Trojan 1750 that includes a rice sized 1 mm piece of aluminum. The fifth row may include control 1760. The sixth row may include shifted 1770 that is shifted in this instance by 1 mm to the left. The indicated distance 1780 represents the distance from the MMW sensor as determined by the transmitted lobe/signal that is reflected to capture IQ data. Each row may include 10 images of one-dimensional beam steering (IQ demodulation and IFFT) with 1-inch steps between images to determine time domain response. The approach 1700 includes the TD response (i.e., space) slices and difference with average response (expected response) of all four control measurements. Brighter regions illustrate higher deviation from the average with all data normalized for relative comparison.

Figure 18:
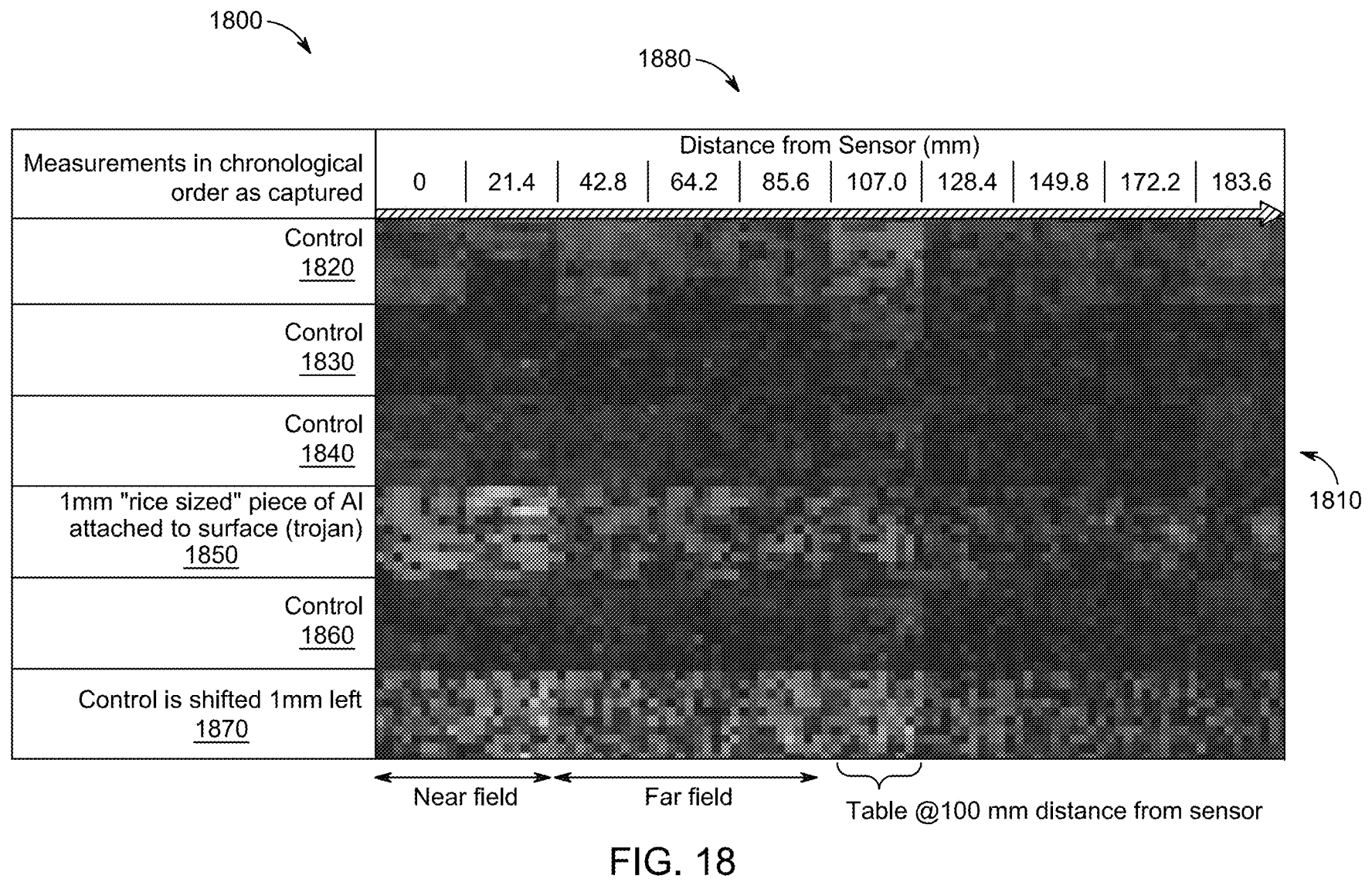

FIG. 18 illustrates another example approach 1800 that may be used to determine the best configuration for an MMW radar data capture and analysis. The captured data from an MMW radar may be dissected based on the distance/length of the lobe of the signal represented by the indicated distance each column. In capturing this data, the table is approximately 100 mm from the MMW sensor. The data has been captured in multiple instances as shown in each row 1810. The first row may include control 1820. The second row may include control 1830. The third row may include control 1840. The fourth row may include Trojan 1850 that includes a rice sized 1 mm piece of aluminum. The fifth row may include control 1860. The sixth row may include shifted 1870 that is shifted in this instance by 1 mm to the left. The indicated distance 1880 represents the distance from the MMW sensor as determined by the transmitted lobe/signal that is reflected to capture IQ data. Each row may include 10 images of one-dimensional beam steering (IQ demodulation and IFFT) with 1-inch steps between images to determine time domain response.

Figure 19:
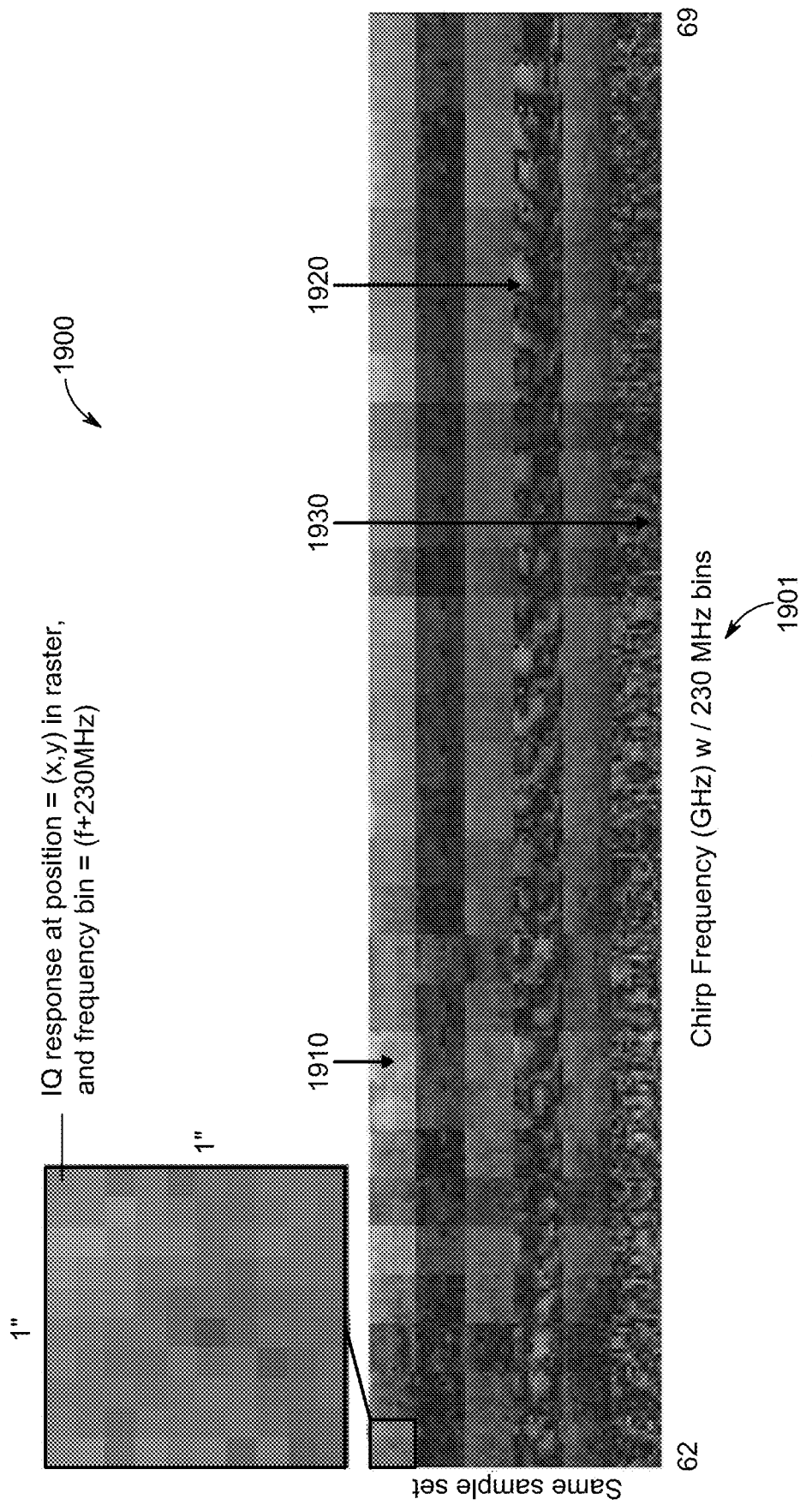
FIG. 19 illustrates multiple instances of raw Quadrature signal (IQ) of MMW radar.

FIG. 19 illustrates multiple instances of raw Quadrature signal (IQ) of MMW radar. The actual scan space of each instance of data capture represent a 10×10 grid 1901. Within each block of that grid 1901 may be 20×20 pixels that correspond with the 20 RX and 20 TX of the MMW radar. These pixels may represent the IQ response at a position (x,y) in raster, and a frequency bin (e.g., 230 MHz). The block 1901 represents a data set of the processed raw data in rows that, starting from top and going down the rows include control, control, control, Trojan, control, shifted. Each column is a different frequency bin that is illustrated in increments of 230 MHz. As would be understood by those possessing an ordinary skill in the pertinent arts, the top row of control may have been an errant instance of data capture and may not be representative of other control instances. The top row of control shows strong deviation 1910 from the expected value but the deviation deems to be global indicating the error. The deviation 1920 pattern in the anomaly (Trojan) row is different and distinct from the error 1930 as well as for the other control rows.

Figure 20:
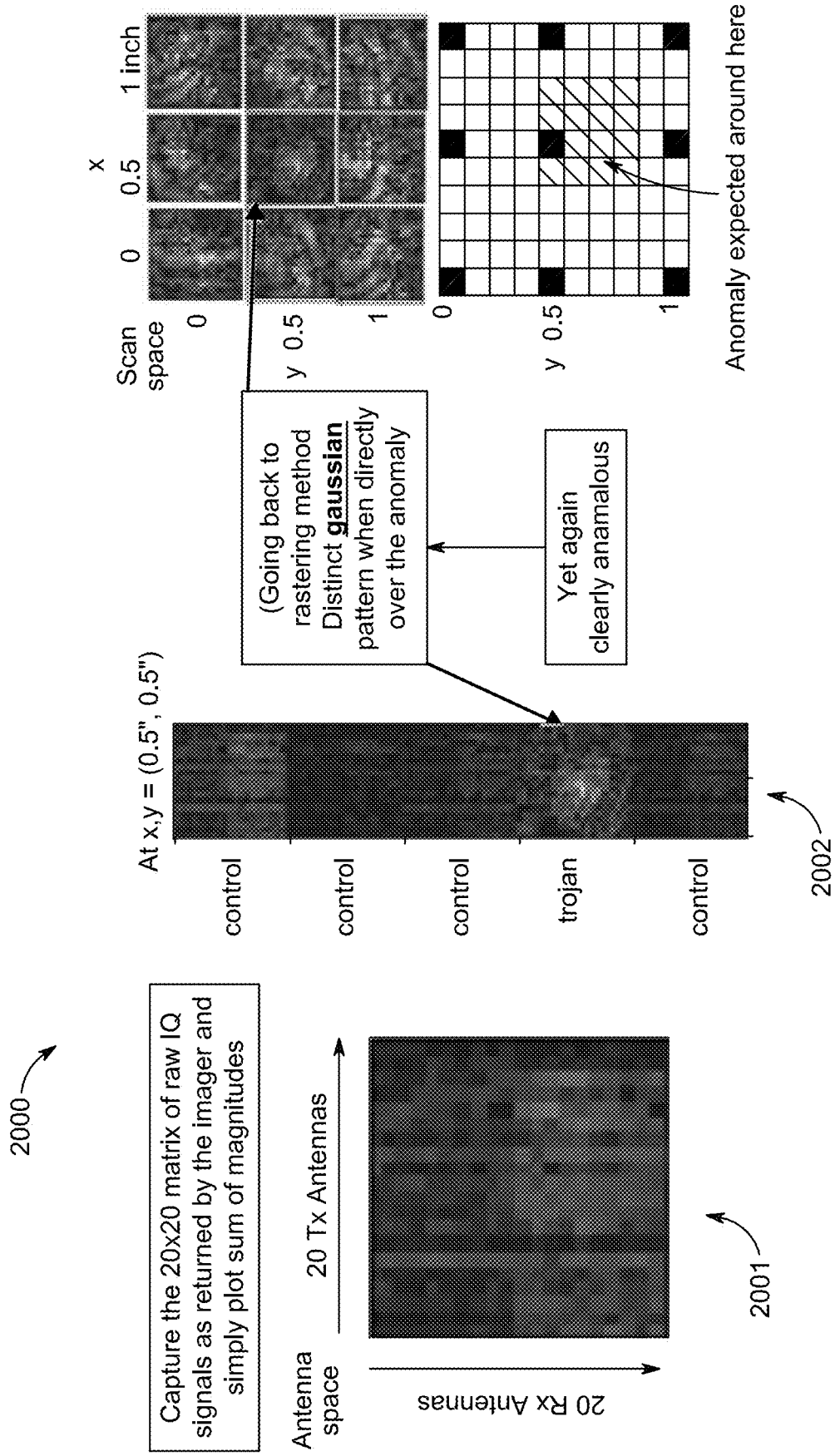
FIG. 20 and FIG. 21 illustrate processed images derived from the raw data of MMW radar scanning of an entire sample.
Figure 21:
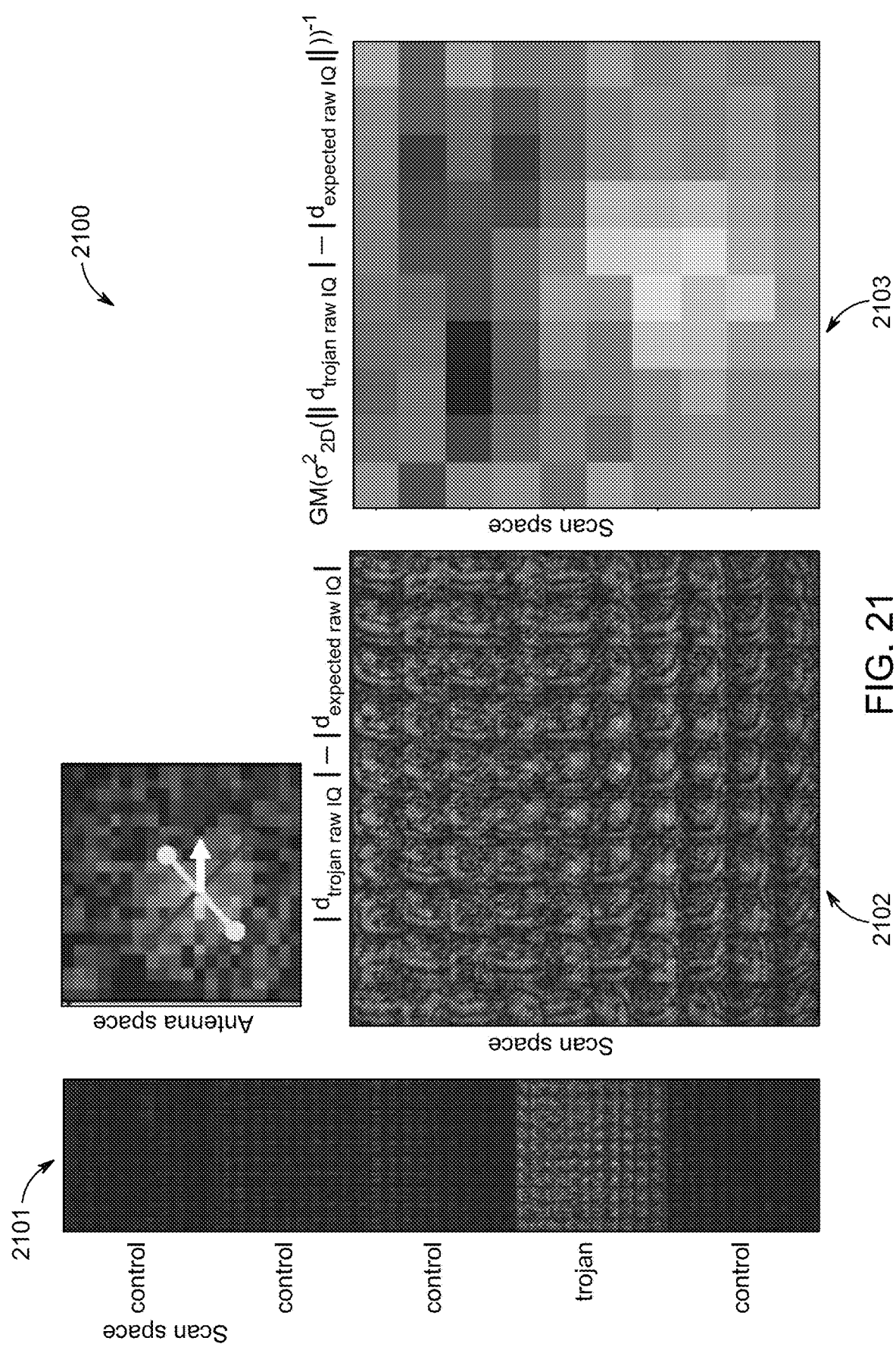

FIG. 20 and FIG. 21 illustrate processed images 2000, 2100, respectively, derived from the raw data of MMW radar scanning of an entire sample. In FIG. 20, for example, the antenna space 2001 within each block of a grid may be 20×20 pixels that correspond with the 20 RX and 20 TX of the MMW radar. Depiction 2002 represents several instances of data capture of the antenna space with control, control, control, Trojan, and control as described herein. In the trojan portion of depiction 2002, the image illustrates the presence of an anomaly. As is illustrated in FIG. 20, the rastering performed has provided spatial specificity. The image provides a distinct gaussian pattern when directly over the anomaly. FIG. 20 indicates that a one-dimensional scan may be performed, and then followed by scans in other dimensions as anomalies are detected.

In FIG. 21, for example, depiction 2101 represents the different instances (e.g., control, control, control, trojan, control) of data capture used to determine the configuration and effectiveness of MMW radar in an inspection system. The processed data may emphasize one aspect of the raw data (e.g., frequency band, magnitude, amplitude, etc.). The aspect may be normalized to generate the images illustrated image 2102 and image 2103. As illustrated in FIG. 21, a measurement of the two-dimensional gaussian may be performed using the inverse geometric mean of a two-dimensional gaussian stance. This calculation may be performed at each point in the scan space as depicted in image 2102 and the enlarged version in image 2103.

Figure 22:
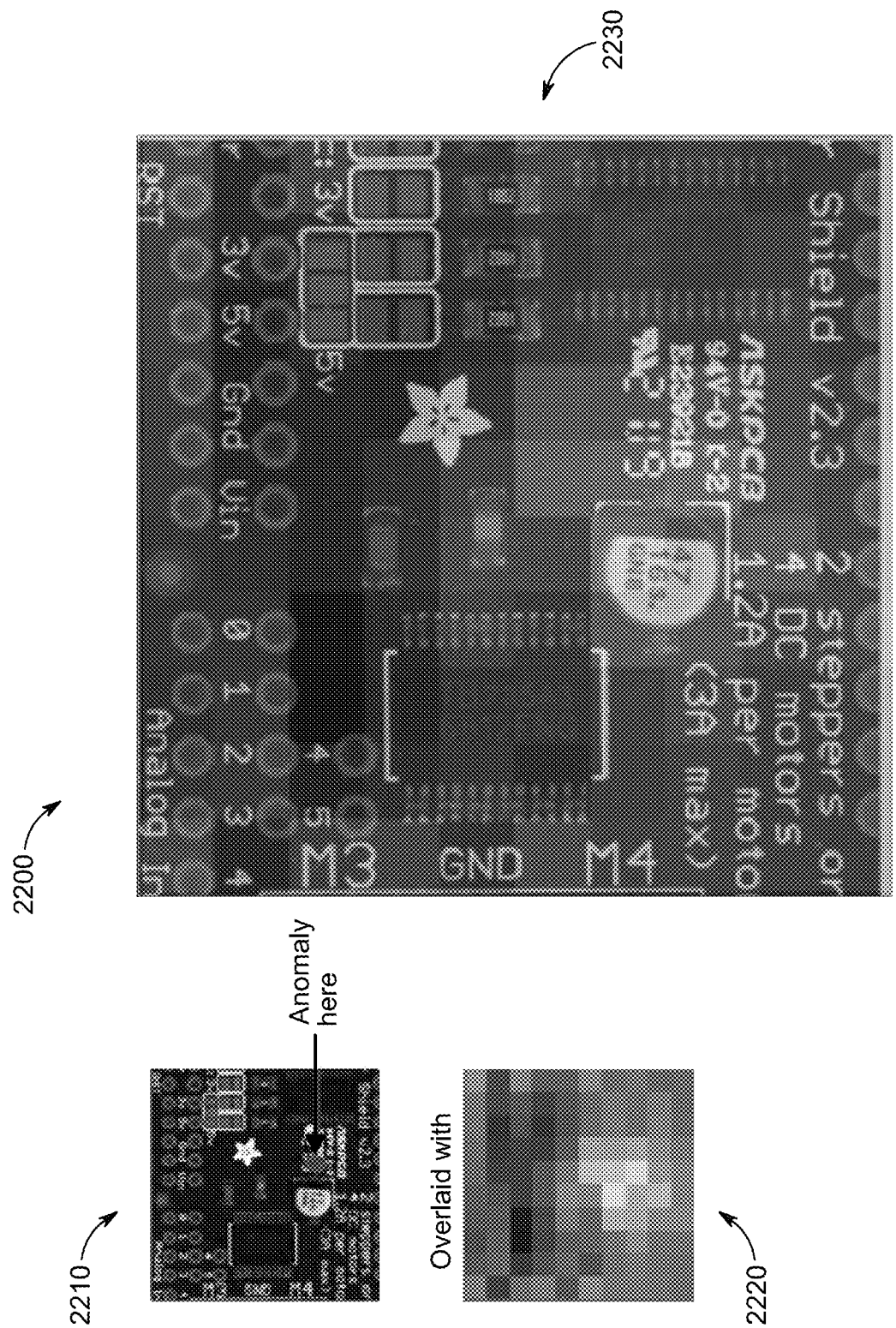
FIG. 22 illustrates an image of an example sample PCB overlaid with the processed IQ data.

FIG. 22 illustrates an image 2200 of an example sample PCB overlaid with the processed IQ data. Image 2200 may be spatially processed allowing overlay with other modalities of MIS 100, including the VIS modality in image 2210 which depicts the sample PCB. The processed IQ data represented in image 2220. The overlay of image 2210 and image 2220 produces the overlay image 2230. Overlay image 2230 allows visualization of the process IQ data in image 2220 with registration to the VIS modality in image 2210 to identify the anomalies and where on the PCB the anomalies are located.

Figure 23:
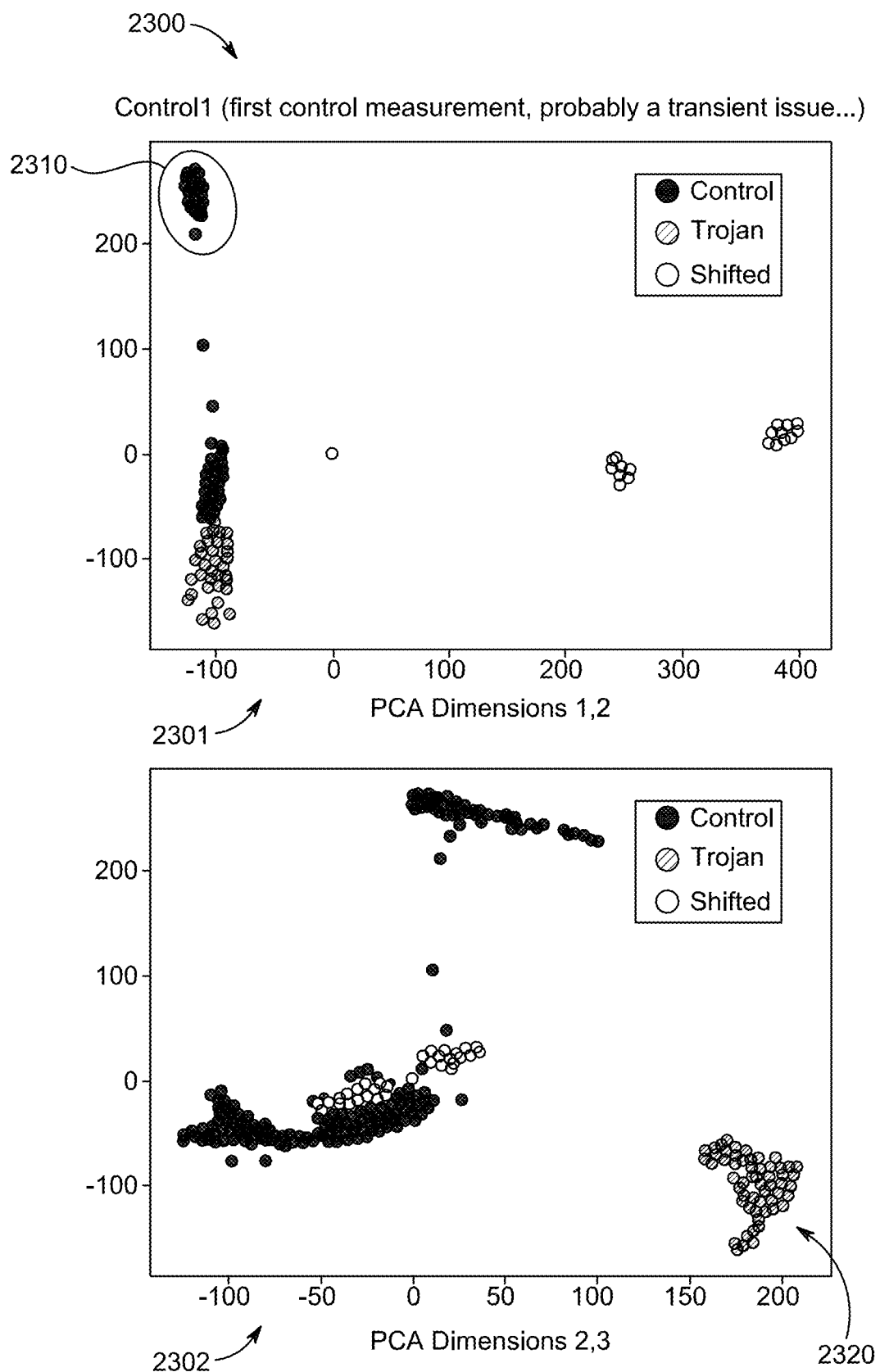
FIG. 23 illustrates an example of Principle Component Analysis (PCA) of the raw captured data from MMW radar.

FIG. 23 illustrates an example 2300 of Principle Component Analysis (PCA) of the raw captured data from MMW radar. PCA may incorporate statistical analysis to generate graphs of dimensions where dimensions are the function of an aspect of the signal (e.g., each frequency band may be a dimension). The dimensions determined may be of import of the IQ signals captured during MMQ data acquisition. In image 2301 and image 2302, the control is a PCA performed on the raw data from an MMW radar under different circumstances. Control may include several instances of data capture of the same board unmoved and unmodified. Trojan indicates that an anomaly has been included on the board. Shifted indicates that the board was moved but had no underlying anomaly. The data capture circled in red 2310 may have been the result of human error. The trojan grouping 2320 in image 2302 evidences a present anomaly. The example 2300 of FIG. 17 demonstrates that the control and shifted PCA data provide agreement to differentiate from the PCA data when an anomaly is present on the sample.

Figure 24:
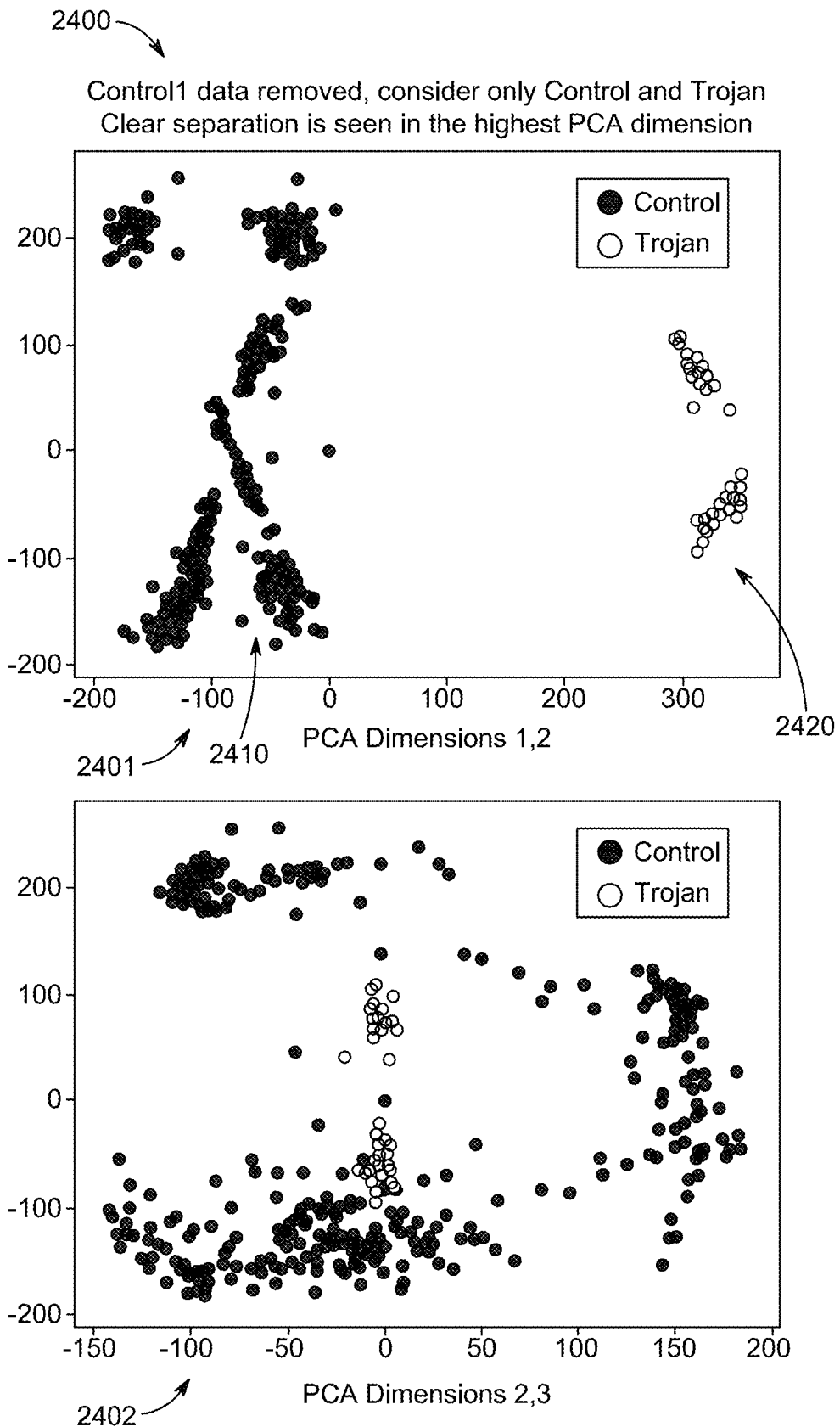
FIG. 24 illustrates an example PCA including control and Trojan samples.

FIG. 24 illustrates an example 2400 PCA including control and Trojan samples. Machine learning may be applied to the PCA data in order to automate the anomaly detection process. In the example PCA of FIG. 24, the dimensions 2 and 3 leading to plot 2402 may be less helpful than dimensions 1 and 2 leading to plot 2401, as the PCA for dimensions 1 and 2 illustrated a discernable separation. In FIG. 24, the trojan presents points 2420 may be compared to the control points 2410. The separation illustrates the ability to discern the anomaly using dimensions 1, 2.

Figure 25:
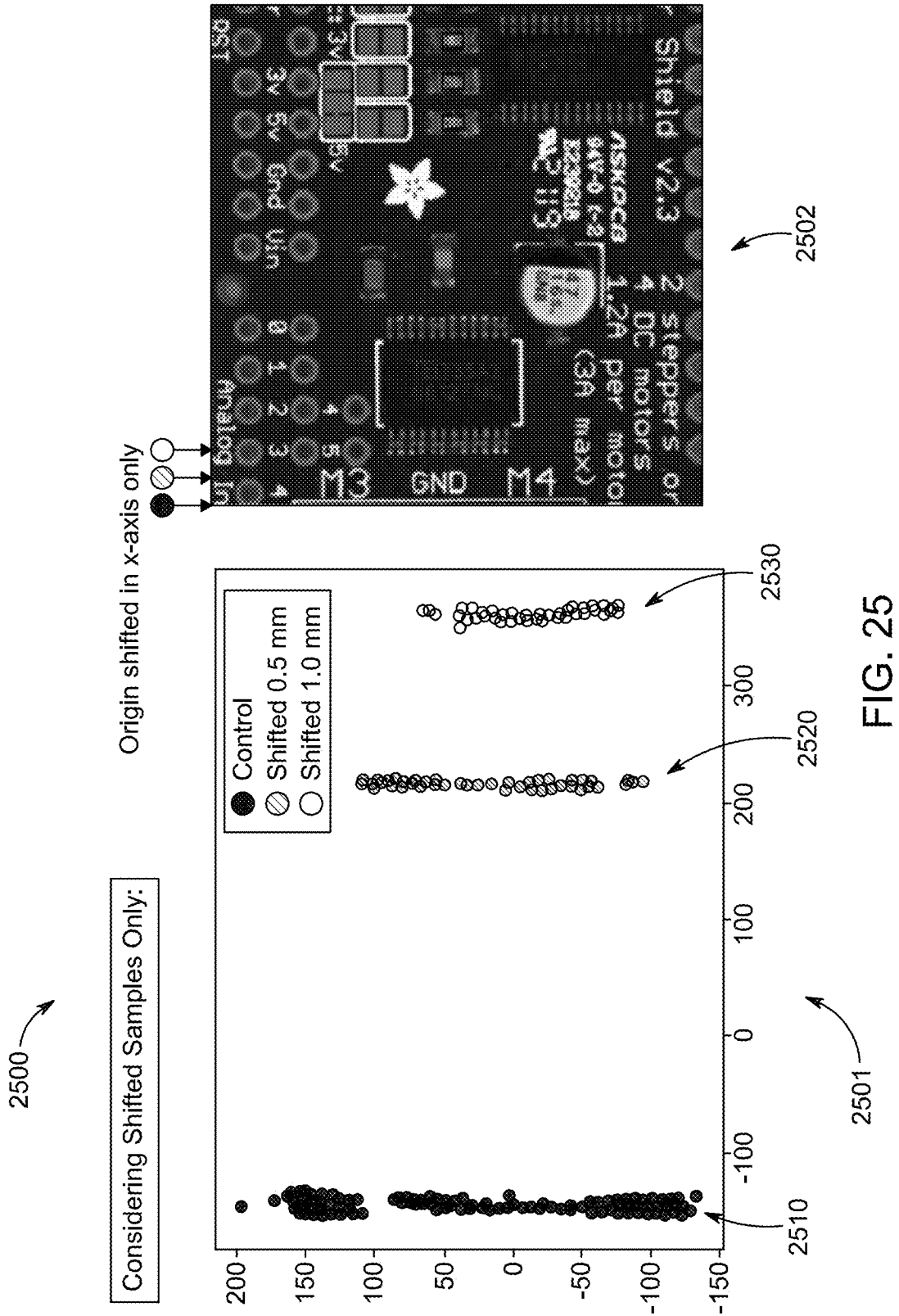
FIG. 25 illustrates an example of PCA with shifted samples.

FIG. 25 illustrates an example 2500 of PCA with shifted samples. Depiction 2501 illustrates the PCA and depiction 2502 illustrates the instances of data capture. In comparing depiction 2501 and depiction 2502 a progressive shift in physical space from purple points 2510, to green points 2520, to yellow points 2530 is indicated. The control includes points 2510, shifted 0.5 mm illustrated by points 2520, and shifted 1 mm illustrated by points 2530.

Figure 26:
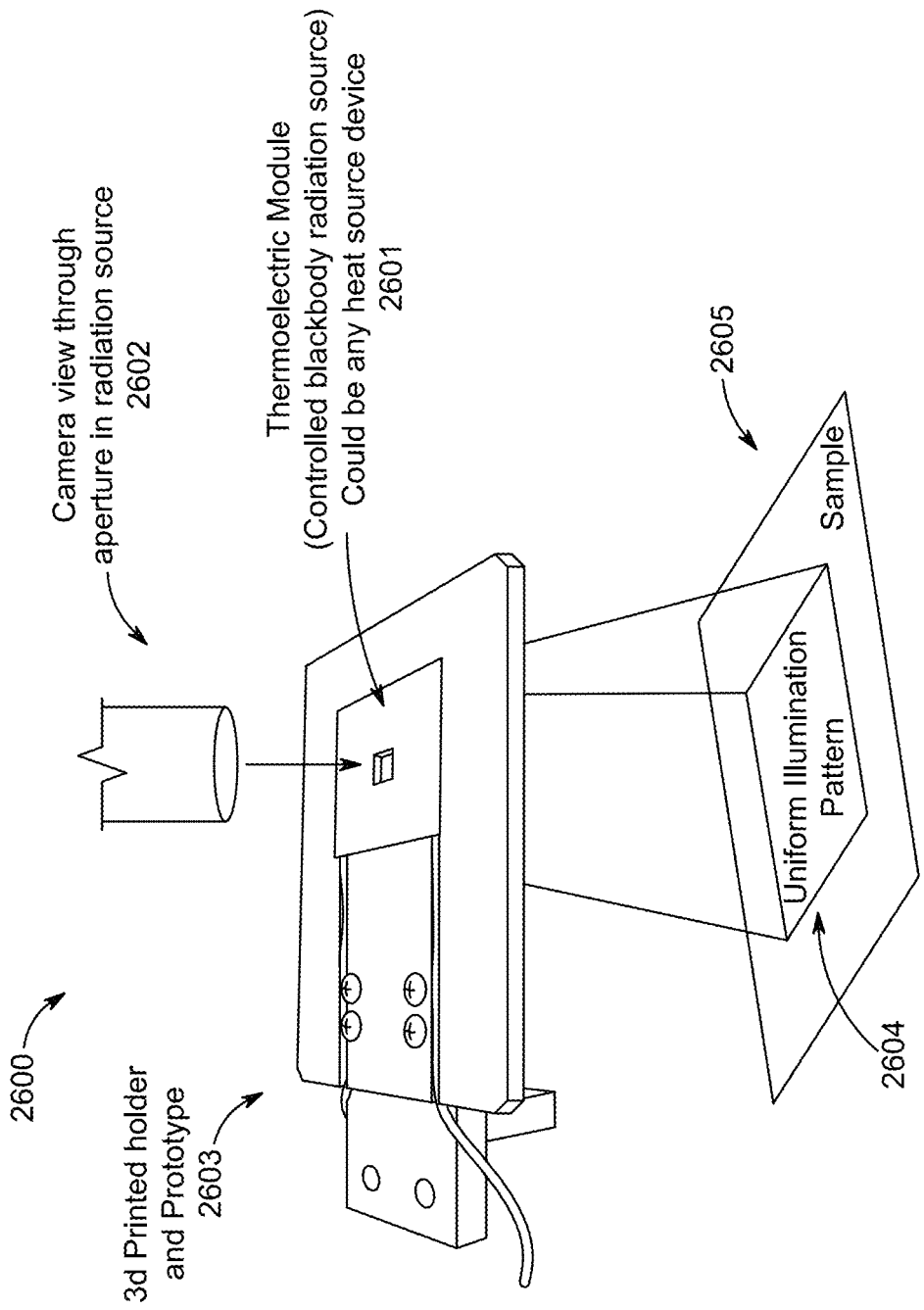
FIG. 26 illustrates an example Long Wave Infrared (LWIR) uniform illuminator modality.

FIG. 26 illustrates an example Long Wave Infrared (LWIR) uniform illuminator 2600 modality. LWIR may facilitate the generation of an image using a temperature-controlled blackbody radiator to uniformly illuminate samples at short ranges analogous to a uniform white light ring for VIS modality. LWIR may be implemented using a radiation source, illuminator, such as a thermoelectric module 2601 (e.g., any heat source) held by a mount 2603 (e.g., prototype 3D printed holder as shown) allowing a sensor 2602 (e.g., VIS camera) captures data through an aperture of the radiation source 2601. Sensor 2602 may have a clear view of the sample 2605 while sample 2605 is uniformly illuminated 2604 by the radiation source 2601. As would be understood by those possessing an ordinary skill in the pertinent art, the illuminator may be temperature controlled.

In scenarios having a sample at the same temperature as the ambient temperature of the inspection environment, the image contrast may be dominated by the reflection component which, specifically for near-normal sensors at short ranges less than 1 meter from the sample, may include reflections from the sensor. This sensor reflection may not be uniform and may be problematic to remove via background subtraction. To improve this sensor reflection issue, a blackbody radiation source may be placed to uniformly illuminate the sample with LWIR radiation at a temperature sufficiently higher than the ambient temperature of the inspection environment, and equal to or higher than any radiation the sensor may provide, to eliminate the non-uniform ambient illumination that introduces environmental noise into the image.

In some instances, the radiation emanating from the warm camera may reflected by the sample and detected at the detector. Such reflected radiation may be included in every frame of the mosaic and become more pronounced when stitching is performed. Since the camera is warmer than room temperature, the radiation may provide a faint, but non-negligible, glow when the camera is directed toward thermally reflective samples. This reflection may be difficult to remove from the images once detected. In order to minimize the effects, a heat source (e.g., LWIR illuminator) may have a temperature near that of the camera to address the non-uniformity that may be introduced by the radiation reflection of the camera. Additionally, or alternatively, the sensor may be oriented slightly angled (e.g., more than near-normal) to hide the camera from its own view. The heat source may also be used at a reflected angle. A near-normal sensor may be defined with the primary axis of the sensor (e.g., camera) close to orthogonal (~90 degrees relative to the sample plane) and proximately close to the sample.

The approach to LWIR illumination described herein provides a pattern of steady-state uniform illumination over the imaged area. A radiation source that is pulse-modulated and not spatially uniform may not be able provide such benefits including generating a consistent signature over several data captures without a change to a PCB.

Figure 27:
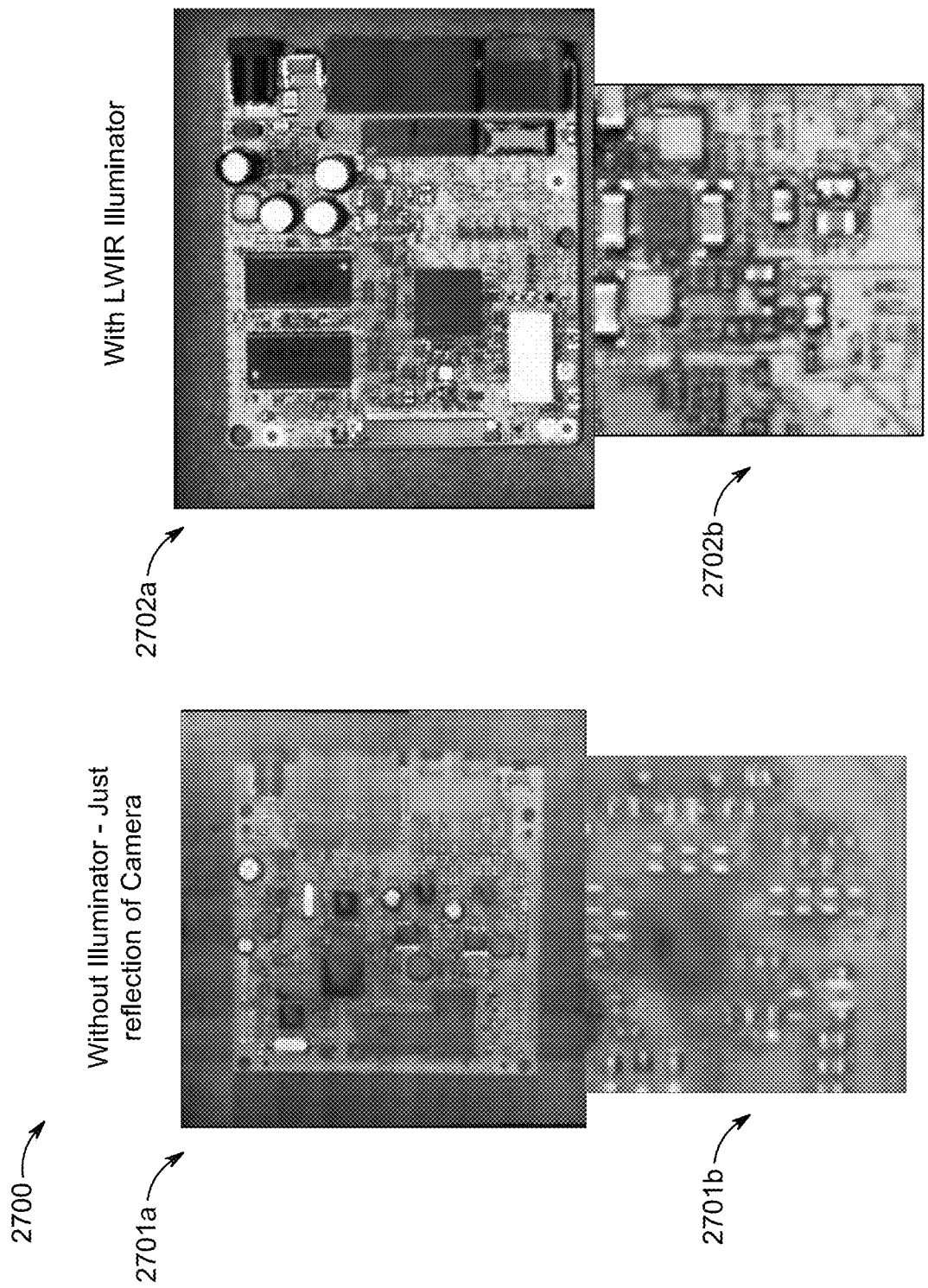
FIG. 27 illustrates an example set of Long Wave Infrared (LWIR) output images.

FIG. 27 illustrates an example set of Long Wave Infrared (LWIR) output images 2700. Objects in an LWIR image may be resolved by measuring a combination of blackbody radiation emission from, and ambient radiation reflections incident on, a sample surface. On the left top side, image 2701*a*, there is an example image of a sample PCB board as captured with just the reflection of the camera (e.g., unilluminated). The close-up image 2701*b* is difficult to discern elements and appears blurry as a result of a lower modulation transfer ratio. A lower modulation transfer ratio occurs from the lateral sampling rate (e.g., DPI) being the same with the contrast on smaller features being better resolved. On the right top side, image 2702*a*, there is an example image of a sample PCB with LWIR illumination. The close-up image 2702*b* is clear and details are more easily recognizable. The sample PCB in 2701 and 2702 are not intended to be the same.

Figure 28:
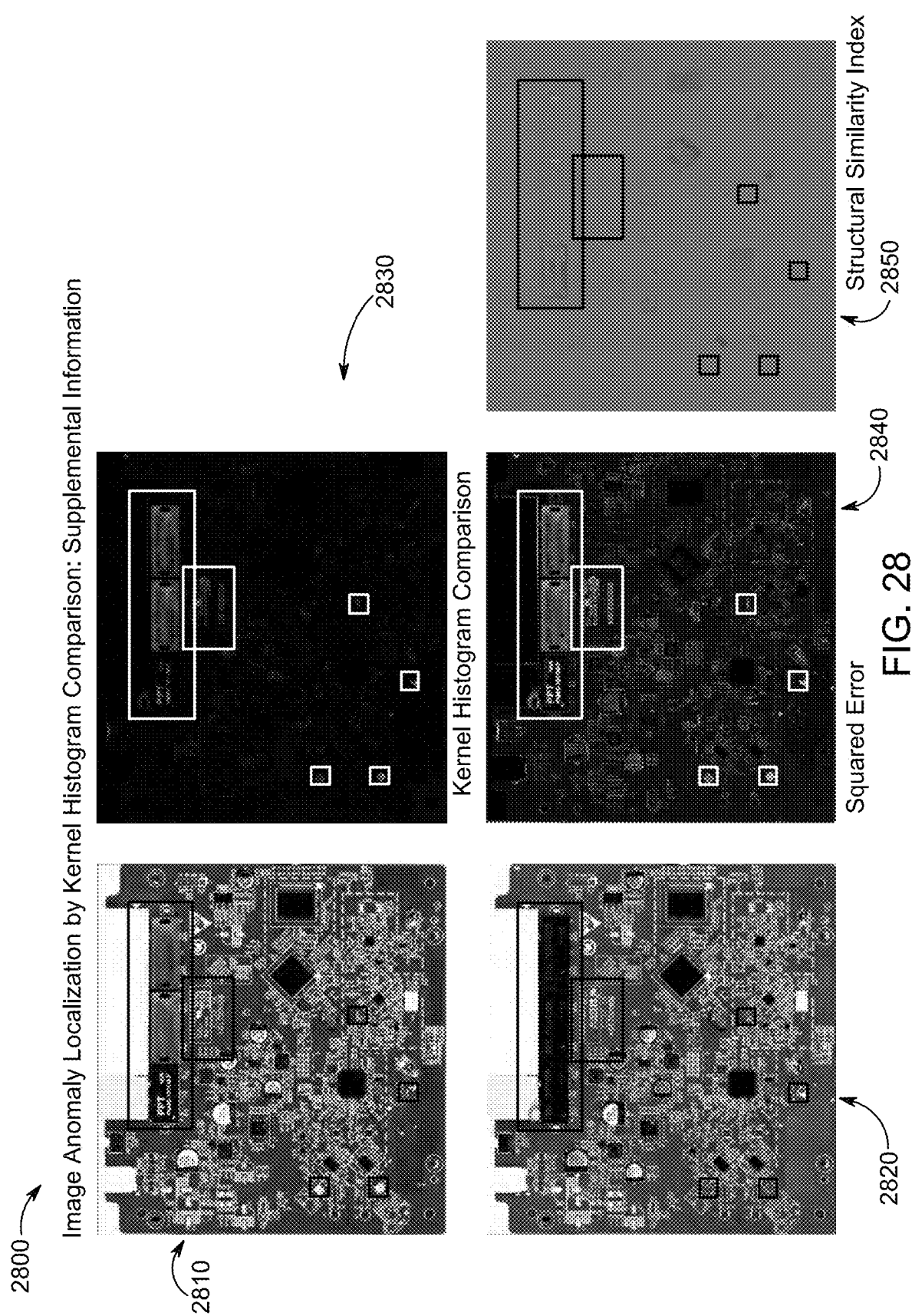
FIG. 28 illustrates an example image anomaly localization.

FIG. 28 illustrates an example image anomaly localization 2800. Given two images, image one 2810 and image two 2820, each of a nearly-identical object from the same perspective with the same illumination, anomaly localization 2800 may localize, by detecting and locating, differences in color or presence of objects between the nearly identical images 2810, 2820. The localization 2800 may suppress the false detection of slight translation differences between objects that may diminish the probability of detection for anomalies of interest.

Squared error image 2840 and structural similarity image 2850 are two methods used to localize differences among two-nearly identical images 2810, 2820. Squared error may compute anomalous values around objects with slight translation differences and may hide or minimize actual anomalies of interest. Structural similarity may compute low anomalous values in around objects with slight translation differences and may fail or reduce the detection pf differences in color. Kernel histogram image 1830 may provide a compromise an alternative method. Kernel histogram, comparing histograms of a sliding window, may effectively suppress anomaly values due to translation differences and score higher for color differences.

Figure 29:
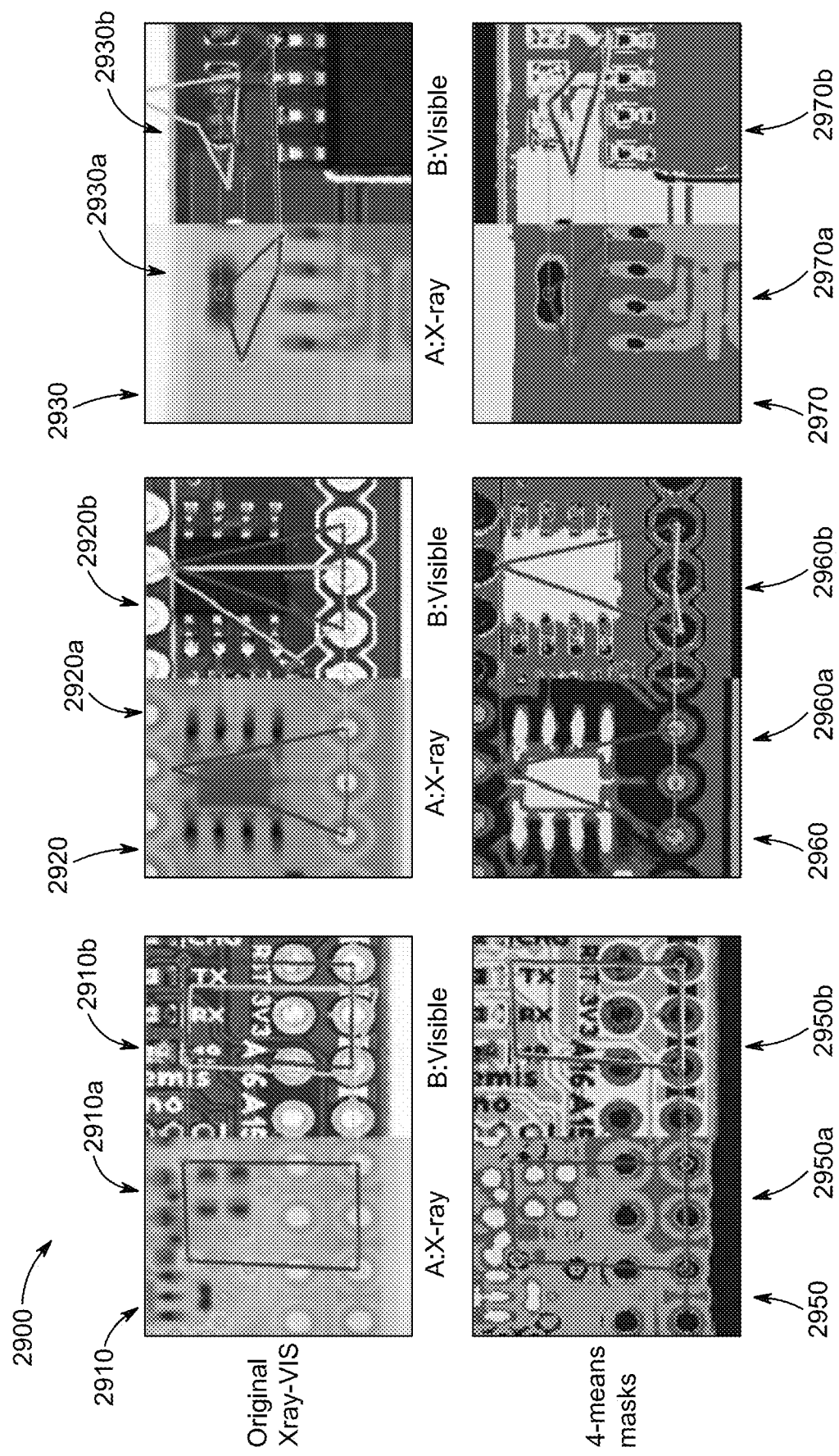
FIG. 29 illustrates a series of images demonstrating intermodal image registration using a convolutional neural network (CNN)

FIG. 29 illustrates a series of images 2900 demonstrating intermodal image registration using a convolutional neural network (CNN). Series of images 2900 include a first X-ray-visible image pair 2910, a second x-ray-visible pair 2920 and a third X-ray-visible image pair 2930. In each of the respective X-ray-visible pairs there is illustrated an X-ray image illustrated on the left side of each pair 2910, 2920, 2930 labeled side A:X-ray and a corresponding visible image illustrated on the right side of each pair 2910, 2920, 2930 labeled side B:Visible. Specifically, in the first X-ray-visible pair 2910 there is an X-ray image 2910*a* and a visible image 2910*b*, in the second X-ray-visible pair 2920 there is an X-ray image 2920*a* and a visible image 2920*b*, and in the third X-ray-visible pair 2930 there is an X-ray image 2930*a* and a visible image 2930*b*.

Intermodal registration, i.e., alignment of the X-ray-visible pair of images, provides unique challenges. Automated intermodal image alignment is uniquely challenging because images taken using different regions of the light spectrum often appear different. Automated alignment of images of the same subject from different regions of the electromagnetic spectrum is hard because of this difference in appearance. The difference may result from different materials in the object have different reflectivity and absorptivity depending on the wavelength of light being used in the detection. Automation of alignment is useful to reduce the costly work hours of manual alignment. While automatic alignment has been developed successfully for images from the same spectral region, such as alignment of two images of the same subject in the visual spectrum, this alignment has not been achieved for images from different wavelength regions of the electromagnetic spectrum, such as aligning a visual image to a UV image, or a visual image to an X-ray image, for example.

Preprocessing the intermodal image pairs from the MIS 100 multimodal datasets in order to reduce extraneous detail and emphasize common features enables alignment of images across wavelength regions. The CNN registers the intermodal pairs based on feature recognition. Given that the images are captured under different regions of the electromagnetic spectrum, the input image pairs are modified to reduce the complexity of the comparison and the CNN may be trained using machine learning algorithms to find the best alignment for image pairs.

As CNNs powerfully learn local textures and identify features in images, and non-local and non-linear correlations between such features and textures within a given class of images, training a CNN to align images from two modalities by learning to associate equivalent visually distinct features, textures, intensities, and feature combinations in the two modalities. This training allows the CNN to identify the same object in two images even when the images are taken in different regions in the electromagnetic spectrum.

A collection of statistical tools may be used to preprocess the image pairs in order to accentuate similarities. This includes regularizing shading/coloring and reducing extraneous information that inhibits alignment. By combining a k-means algorithm with mutual information analysis to generate few-color masks of image pairs. Combing the techniques reduces the differences between image modalities.

The automated preprocessing may be designed to emphasize common information. The steps may include processing to reduce details in the image and accentuate similarities between the images in a pair. This reduction may occur by binning pixel intensities using the k-means technique to generate two, three or few-color masks. In doing so the pairs of images 2910, 2920, 2930 may be k-means, illustrates a 4-means, masked to produce image pairs 2950, 2960, 2970. Specifically, in the first X-ray-visible pair 2910 is reduced via k-means to image pair 2950 including the reduced X-ray image 2950*a* and the reduced visible image 2950*b*, in the second X-ray-visible pair 2920 is reduced via k-means to image pair 2960 including the reduced X-ray image 2960*a* and the reduced visible image 2960*b*, and in the third X-ray-visible pair 2930 is reduced via k-means to image pair 2970 including the reduced X-ray image 2970*a* and the reduced visible image 2970*b*.

As illustrated in the 4-means row of images, in bringing the modalities closer together, the images are color coded via the intensity bins (4-means) to allow equivalent features from each modality to be shaded the same. This color coding may be performed by ranking the k-means bins by population and applying the same color code scheme to the ranking in each modality. The set of joint probabilities between images may be masked.

Once aligned the X-ray-visual image pairs may be processed. As illustrated in FIG. 29, the red quadrangles represent four equivalent points in each pair of images and the yellow quadrangle is the prediction of where those four points fall. Performance improves when masks are substituted for original images.

Figure 30:
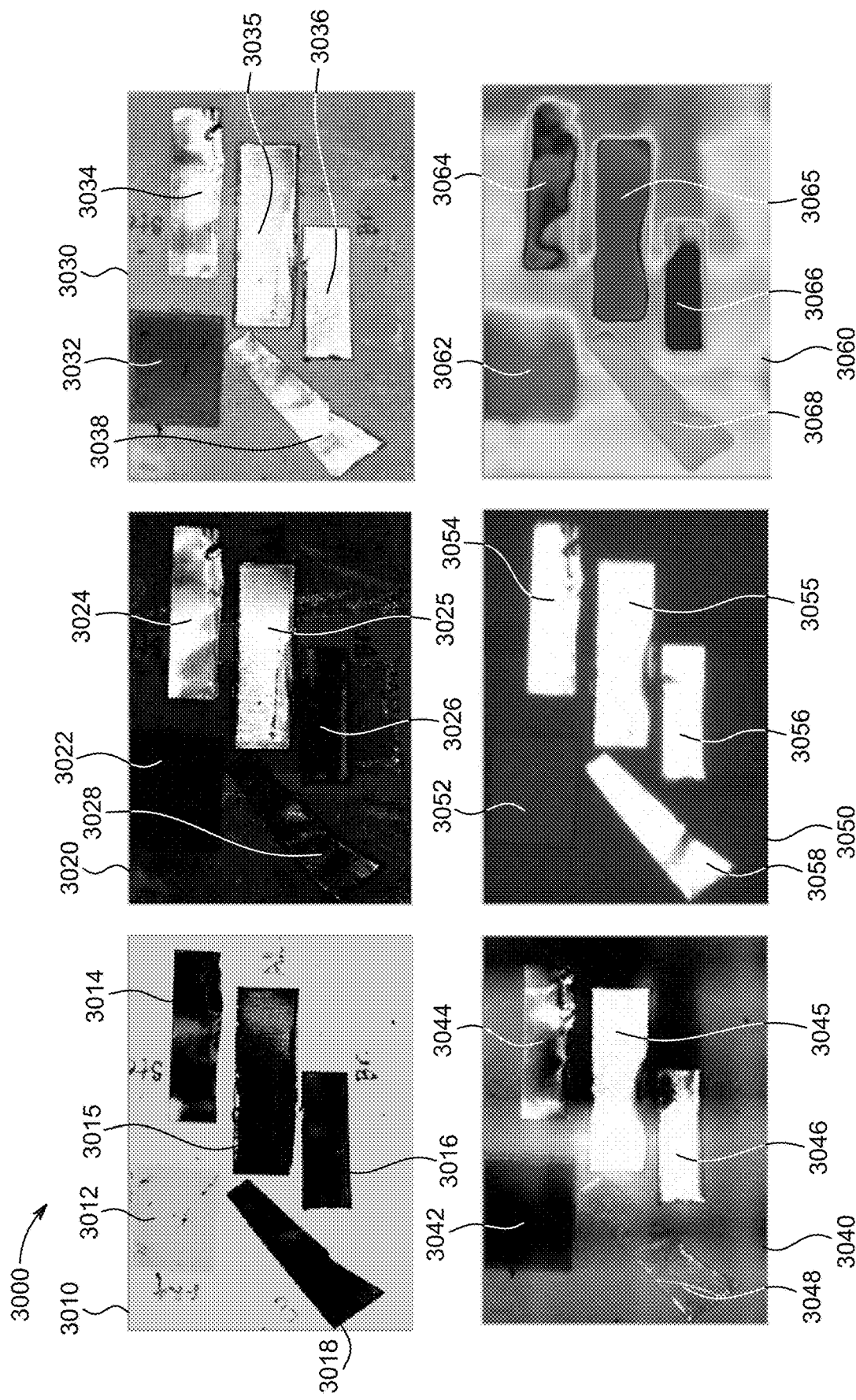
FIG. 30 illustrates an example multimodal image segmentation.

FIG. 30 illustrates an example 3000 multimodal image segmentation. Multimodal images, or multimodal signatures, are digital representations of objects in a scene with each pixel of the image containing information captured by multiple different sensors. The multimodal signature may be segmented into subregions based on pixels with similar multimodal values and mutual proximity. The segmentation process may be performed by a statistical model, such as k-means clustering, of CNN.

Image segmentation performed using single-modality images may be unable to distinguish between two different regions that exhibit similar signatures to that single sensor. A multimodal image segmentation process may leverage the additional information in other modalities to more accurately differentiate two similar objects or similar materials in a scene. This increase in performance offers and advantage to any application, including MIS 100, that uses computer vision with access to multiple imaging modalities.

As the sensor array increases the spectral bandwidth, the ability to different material also increases. The application for the segmentation may include object identification, region classification, and outlier detection. This may include a recycling plant classifying polymers and metals in assisting sorting functions.

Example 3000 multimodal image segmentation may include images from modalities including Visible spectrum (VIS) illustrated as image 3010, Ultraviolet-A (UV) illustrated as image 3020, Near Infrared (NIR) illustrated as image 3030, Shortwave Infrared (SWIR) illustrated as image 3040, Longwave Infrared (LWIR) illustrated as image 3050, and Segmentation Example illustrated as image 3060.

VIS illustrated as image 3010 may include an image from a Visible CCD camera showing material samples (clockwise from top left) (1) FR4 circuit board material 3012, (2) steel 3014, (3) aluminum 3015, (4) brass 3016, and (5) copper 3018.

UV illustrated as image 3020 may include an image from a UV detector where steel 3024 and aluminum 3025 exhibit a response clearly different than copper 3028 and brass 3026. This difference may be a result of their color appearance.

NIR illustrated as image 3030 illustrates that the metals 3034, 3035, 3036, 3038 exhibit a similar response while FR4 3032 is unique.

SWIR illustrated as image 3040 illustrates brass 3046 and copper 3048 differentiated clearly, and aluminum 3045 and steel 3044 are also clearly differentiated.

LWIR illustrated as image 3050 illustrates metals 3054, 3055, 3056, 3058 and non-metals 3052 are clearly differentiated.

Segmentation Example illustrated as image 3060 illustrates a false color map showing example segmented scene using a statistical model. The materials exhibit distinguishable colors (classes) based on the accumulation of information from each of the modalities.

Raman spectroscopy may also be included as another modality. Raman spectroscopy may be performed with a line scanner, in a push-broom capture method. Multiple line scan strips may be combined to form a wide-area mosaic. The wide-area mosaic may be registered with the rest of the multimodal signature generated by MMS 100. Raman spectroscopy modality enables calibrated material characterization and cross-referencing of measured spectra with databases of known material Raman signatures. These signatures may include a visual image, identifying bone in a meat product, and identifying fat content and regions of fat and other materials based on the Raman signatures.

Although different embodiments and examples reference different techniques and features, one of ordinary skill in the art will appreciate that each technique or feature may be used alone or in any combination with the other techniques or features disclosed herein, or disclosed in a related provisional application.

What is claimed:

1. A method of automated calibration of multimodal sensors, the method comprising:
   capturing a data sample from at least one modality of the multimodal sensors;
   analyzing the captured data sample for one or more circles;
   on a condition that the analyzing determines a single circle, centering the single circle in the center of an image from the data sample;
   on a condition that the analyzing determines more than one circle, determining a center of a centroid of a threshold image from the data sample; and
   calibrating the at least one modality by comparing the centered single circle or center of the centroid with the center added from at least one other modalities of the multimodal sensors.

2. The method of claim 1, wherein one modality of the multimodal sensors is a millimeter wave (MMW) radar.

3. The method of claim 2, wherein the captured data for from the MMW radar includes data from a 20×20 antenna array.

4. The method of claim 1, wherein one modality of the multimodal sensors is Long Wave Infrared (LWIR).

5. The method of claim 4, wherein a radiation source is operated during the capturing for the LWIR sensor.

6. The method of claim 1, wherein the at least one modality and at least one other modality are configured to locate the same point when capturing the data.

7. The method of claim 1, wherein determining a single circle includes determining an edge of the single circle.

8. The method of claim 7, wherein determining the edge includes performing a Hough transform.

9. The method of claim 1, wherein comparing the centered single circle or center of the centroid with the center added from at least one other modalities of the multimodal sensors includes a determination if the centers align.

10. The method of claim 1, further comprising transforming data from the at least one modality of the multimodal sensors from a perspective of the at least one modality of the multimodal sensors into physical space.

11. A system comprising:
    a plurality of sensors;
    a calibration target configured to represent a circle and viewable by ones of the plurality of sensors; and
    a processor configured to:
    cause the plurality of sensors to capture data related to the viewing of the calibration target and to generate a set of captured data for each sensor of the plurality of sensors;
    perform spatial correlation on each set of captured data by analyzing the set of captured data for each sensor of the plurality of sensors for a circle;
    on a condition that the analyzing determines a single circle, center the single circle in the center of an image from the data sample;
    on a condition that the analyzing determines more than one circle, determine a center of a centroid of a threshold image from the data sample; and
    calibrate one of the plurality of sensors by comparing the centered single circle or center of the centroid with the center added from at least one other of the plurality of sensors.

12. The system of claim 11, wherein one the plurality of sensors is a millimeter wave (MMW) radar.

13. The system of claim 12, wherein the captured data for from the MMW radar includes data from a 20×20 antenna array.

14. The system of claim 11, wherein one the plurality of sensors is Long Wave Infrared (LWIR).

15. The system of claim 14, wherein a radiation source is operated during the capturing for the LWIR sensor.

16. The system of claim 11, wherein the plurality of sensors are configured to locate the calibration target when capturing the data.

17. The system of claim 11, wherein determining a single circle includes determining an edge of the single circle.

18. The system of claim 17, wherein determining the edge includes performing a Hough transform.

19. The system of claim 11, wherein comparing the centered single circle or center of the centroid with the center added from at least one other sensor of the plurality of sensors includes a determination if the centers align.

20. The system of claim 11, wherein the processor further transforms data from one sensor of the plurality of sensors from a perspective of one sensor into physical space.

* * * * *